US010249873B2

(12) United States Patent
Kim et al.

(10) Patent No.: US 10,249,873 B2
(45) Date of Patent: Apr. 2, 2019

(54) COMPOSITE POSITIVE ACTIVE MATERIAL, POSITIVE ELECTRODE INCLUDING THE SAME, AND LITHIUM BATTERY INCLUDING THE POSITIVE ELECTRODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Donghan Kim, Suwon-si (KR); Jayhyok Song, Yongin-si (KR); Jinhwan Park, Seoul (KR)

(73) Assignees: SAMSUNG ELECTRONICS CO. LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 59 days.

(21) Appl. No.: 15/665,132

(22) Filed: Jul. 31, 2017

(65) Prior Publication Data

US 2018/0040882 A1 Feb. 8, 2018

(30) Foreign Application Priority Data

Aug. 3, 2016 (KR) .................. 10-2016-0099062
Jul. 25, 2017 (KR) .................. 10-2017-0094322

(51) Int. Cl.
*H01M 4/36* (2006.01)
*H01M 4/505* (2010.01)
(Continued)

(52) U.S. Cl.
CPC .......... *H01M 4/364* (2013.01); *C01G 23/005* (2013.01); *C01G 25/00* (2013.01); *C01G 45/125* (2013.01);
(Continued)

(58) Field of Classification Search
CPC ...... H01M 4/364; H01M 4/366; H01M 4/131; H01M 4/505; H01M 4/525; C01G 53/50; C01G 53/006; C01G 45/125
See application file for complete search history.

(56) References Cited

U.S. PATENT DOCUMENTS 6,677,082 B2  1/2004  Thackeray et al.
6,680,143 B2  1/2004  Thackeray et al.
(Continued)

FOREIGN PATENT DOCUMENTS

CN  105140492 A   12/2015
EP    2822065 A2    1/2015
(Continued)

OTHER PUBLICATIONS

European Search Report for European Patent Application No. 171845415 dated Oct. 23, 2017.
(Continued)

*Primary Examiner* — Stewart A Fraser
(74) *Attorney, Agent, or Firm* — Cantor Colburn LLP

(57) ABSTRACT

A composite positive active material including a composite represented by Formula 1:

$$\delta Li_2MO_3 \cdot (1-\delta)[xLi_2MnO_3 \cdot (1-x)Li_dNi_aCo_bM'_cO_2] \quad \text{Formula 1}$$

wherein, in Formula 1, M is titanium (Ti) or zirconium (Zr); M' is manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof; and $0<\delta<0.5$; $0\leq x<0.3$; $a+b+c\leq 1$; $0<a<1$; $0<b<1$; $0<c<1$, and $0.95\leq d\leq 1.05$.

23 Claims, 16 Drawing Sheets

(51) Int. Cl.
  *H01M 4/525* (2010.01)
  *H01M 10/0525* (2010.01)
  *H01M 4/38* (2006.01)
  *H01M 4/62* (2006.01)
  *H01M 10/0568* (2010.01)
  *H01M 10/0569* (2010.01)
  *C01G 23/00* (2006.01)
  *C01G 25/00* (2006.01)
  *C01G 45/12* (2006.01)
  *C01G 53/00* (2006.01)
  *H01M 4/131* (2010.01)
  *H01M 10/052* (2010.01)
  *H01M 4/02* (2006.01)

(52) U.S. Cl.
  CPC ........... *C01G 53/006* (2013.01); *C01G 53/50* (2013.01); *H01M 4/131* (2013.01); *H01M 4/366* (2013.01); *H01M 4/382* (2013.01); *H01M 4/505* (2013.01); *H01M 4/525* (2013.01); *H01M 4/623* (2013.01); *H01M 4/625* (2013.01); *H01M 10/052* (2013.01); *H01M 10/0525* (2013.01); *H01M 10/0568* (2013.01); *H01M 10/0569* (2013.01); *C01P 2002/72* (2013.01); *C01P 2002/74* (2013.01); *C01P 2002/86* (2013.01); *C01P 2004/61* (2013.01); *C01P 2004/62* (2013.01); *C01P 2004/64* (2013.01); *C01P 2004/80* (2013.01); *C01P 2004/84* (2013.01); *C01P 2006/11* (2013.01); *H01M 4/624* (2013.01); *H01M 2004/021* (2013.01); *H01M 2004/028* (2013.01); *H01M 2300/004* (2013.01)

(56) References Cited

U.S. PATENT DOCUMENTS

| | | | | |
|---|---|---|---|---|
| 2003/0035999 | A1* | 2/2003 | Gao | ............ C01G 23/005 429/231.1 |
| 2013/0071753 | A1 | 3/2013 | Kim et al. | |
| 2014/0087256 | A1* | 3/2014 | Li | .......... H01M 4/366 429/220 |
| 2014/0087261 | A1 | 3/2014 | Li et al. | |
| 2014/0141325 | A1* | 5/2014 | Yu | .......... H01M 4/485 429/207 |
| 2015/0010823 | A1 | 1/2015 | Yu et al. | |
| 2015/0364756 | A1 | 12/2015 | Kim et al. | |
| 2016/0156027 | A1 | 6/2016 | Kim et al. | |
| 2016/0164088 | A1 | 6/2016 | Peralta et al. | |
| 2017/0179470 | A1* | 6/2017 | Choi | ............ H01M 4/0471 |

FOREIGN PATENT DOCUMENTS

| | | |
|---|---|---|
| EP | 2879209 A1 | 6/2015 |
| JP | 2006202702 A | 8/2006 |
| WO | 2015014807 A1 | 2/2015 |

OTHER PUBLICATIONS

Kong et al., "Li-ion-conductive Li2TiO3-coated Li[Li0.2Mn0.51Ni0.19Co0.1]O2 for high-performance cathode material in lithium-ion battery", J. Solid State Electrochem, 20, 2016, 1435-1443.

Lu et al., "Nanoscale Coating of LiMO2 (M=Ni, Co, Mn) Nanobelts with Li+-Conductive Li2TiO3: Toward Better Rate Capabilities for Li-Ion Batteries", JACS, 135, 2013, 1649-1652.

Meng et al., "Improving the cycling performance of LiNi0.8Co0.1Mn0.1O2 by surface coating with Li2TiO3", Electrochimica Acta, 211, 2016, 822-831.

Freire et al., "A new active Li—Mn—O compound for high energy density Li-ion batteries", Nature Materials, vol. 15, 2016, 173-178.

Robert et al., "Enhancement of the high potential specific charge in layered electrode materials for lithium-ion batteries", Journal of Materials Chemistry A, 2, 2014, 8589.

\* cited by examiner

US 10,249,873 B2

COMPOSITE POSITIVE ACTIVE MATERIAL, POSITIVE ELECTRODE INCLUDING THE SAME, AND LITHIUM BATTERY INCLUDING THE POSITIVE ELECTRODE

CROSS-REFERENCE TO RELATED APPLICATION

This application claims priority to and the benefit of Korean Patent Application Nos. 10-2016-0099062, filed on Aug. 3, 2016, and 10-2017-0094322, filed on Jul. 25, 2017, in the Korean Intellectual Property Office, and all the benefits accruing therefrom under 35 U.S.C. § 119, the contents of which are incorporated herein in their entirety by reference.

BACKGROUND

1. Field

The present disclosure relates to a composite positive active material, a positive electrode including the same, a lithium battery including the positive electrode, and a method of making the composite positive active material.

2. Description of the Related Art

Lithium batteries are used as power sources for vehicles, as well as for portable electronic devices. Accordingly, research to improve the capacity of lithium batteries has been undertaken. As the complexity and functionality of portable electronic devices increases, the demands for small, light, and high-voltage lithium batteries as power sources for such devices has also increased.

To manufacture a lithium battery satisfying these demands, there is a need for a positive active material with improved lifespan and capacity characteristics, as well as reduced discharge voltage decay during repeated charging and discharging.

SUMMARY

Provided is a composite positive active material having a stable structure during repeated charging and discharging.

Provided is a positive electrode including the composite positive active material.

Provided is a lithium battery with improved cell performance, the lithium battery including the positive electrode.

According to an aspect of an embodiment, there is provided a composite positive active material comprising a composite represented by Formula 1:

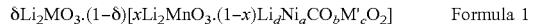   Formula 1 wherein, in Formula 1,

M is titanium (Ti) or zirconium (Zr);

M' is Mn, V, Mg, Ga, Si, W, Mo, Fe, Cr, Cu, Zn, Ti, Al, B, or a combination thereof; and $0<\delta<0.5$; $0 \leq x<0.3$; $a+b+c \leq 1$; $0<a<1$; $0<b<1$; $0<c<1$, and $0.95 \leq d \leq 1.05$.

According to an aspect of another embodiment, a positive electrode includes a composite positive active material including a composite represented by Formula 1:

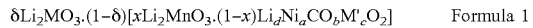   Formula 1 wherein, in Formula 1,

M is Ti or Zr,

M' is Mn, V, Mg, Ga, Si, W, Mo, Fe, Cr, Cu, Zn, Ti, Al, B, or a combination thereof; and $0<\delta<0.5$, $0 \leq x<0.3$, $a+b+c \leq 1$, $0<a<1$, $0<b<1$, $0<c<1$, and $0.95 \leq d \leq 1.05$.

According to an aspect of another embodiment, a lithium battery includes the positive electrode, negative electrode, and an electrolyte disposed between the positive electrode and the negative electrode.

According to an aspect of yet another embodiment, disclosed is a method of providing the a composite positive active material comprising a compound represented by Formula 1

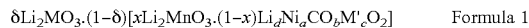   Formula 1 wherein, in Formula 1,

M is Ti or Zr,

M' comprises Mn, V, Mg, Ga, Si, W, Mo, Fe, Cr, Cu, Zn, fvTi, Al, B, or a combination thereof, and $0<\delta<0.5$, $0 \leq x<0.3$, $a+b+c \leq 1$, $0<a<1$, $0<b<1$, $0<c<1$, and $0.95 \leq d \leq 1.05$, wherein the method includes:

providing a precursor mixture comprising a metal hydroxide, a metal carbonate, and a metal oxalate;

preparing a precipitate from the precursor mixture;

mixing the precipitate with a lithium compound and an M precursor to prepare a precipitate mixture; and heat-treating the precipitate mixture to provide the composite positive active material.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
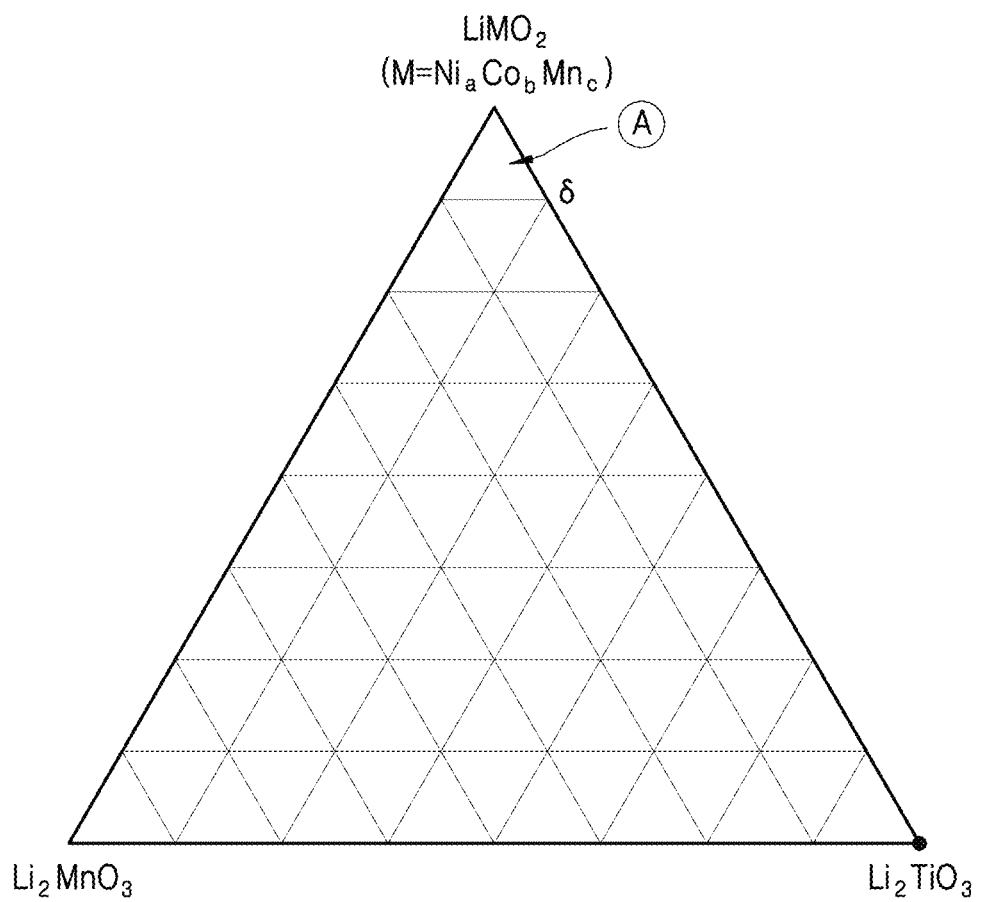
FIG. 1A is a $Li_2MnO_3$-$LiMO_2$-$Li_2TiO_3$ phase diagram which includes a region corresponding to a composite positive active material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The C rate is a discharge rate of a cell, and is obtained by dividing a total capacity of the cell by a total discharge period of time, e.g., a C rate for a battery having a discharge capacity of 1.6 ampere-hours (in case of the total discharge period of time is 1 hour) would be 1.6 amperes.

Hereinafter, a composite positive active material, a method of preparing the composite positive active material, a positive electrode including the composite positive active material, and a lithium battery including the positive electrode will be described in detail with reference to the accompanying drawings.

According to an aspect of an embodiment, a composite positive active material includes a composite represented by Formula 1.

$$\delta Li_2MO_3\cdot(1-\delta)[xLi_2MnO_3\cdot(1-x)Li_dNi_aCo_bM'_cO_2] \quad \text{Formula 1}$$

wherein, in Formula 1,

M is titanium (Ti) or zirconium (Zr);

M' is manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof; and $0<\delta<0.5$, $0\leq x<0.3$, $a+b+c\leq 1$, $0<a<1$, $0<b<1$, $0<c<1$, and $0.95\leq d\leq 1.05$.

When $\delta$ in Formula 1 is within this range, the composite positive active material may have improved structural stability without a reduction in capacity.

In Formula 1, $\delta$ may satisfy $0<\delta<0.1$, for example, $0<\delta<0.05$. In Formula 1, x may satisfy $0<x<0.1$, for example, $0<x<0.05$.

In Formula 1, M may be manganese (Mn) or aluminum (Al).

The compound represented by Formula 1 may include, for example, a compound represented by Formulae 2 to 5.

$$\delta Li_2TiO_3\cdot(1-\delta)[xLi_2MnO_3\cdot(1-x)Li_dNi_aCo_bMn_cO_2] \quad \text{Formula 2}$$

wherein, in Formula 2, $0<\delta<0.1$, $0\leq x<0.1$, $a+b+c\leq 1$, $0<a<1$, $0<b<1$, $0<c<1$, and $0.95\leq d\leq 1.05$, $$\delta Li_2ZrO_3\cdot(1-\delta)[xLi_2MnO_3\cdot(1-x)Li_dNi_aCo_bMn_cO_2] \quad \text{Formula 3}$$

wherein, in Formula 3, $0<\delta<0.1$, $0\leq x<0.1$, $a+b+c\leq 1$, $0<a<1$, $0<b<1$, $0<c<1$, and $0.95\leq d\leq 1.05$, $$\delta Li_2TiO_3\cdot(1-\delta)[xLi_2MnO_3\cdot(1-x)Li_dNi_aCo_bAl_cO_2] \quad \text{Formula 4}$$

wherein, in Formula 4, $0<\delta<0.1$, $0<x<0.1$, $a+b+c=1$, $0<a<1$, $0<b<1$, $0<c<1$, and $0.95\leq d\leq 1.05$, and $$\delta Li_2ZrO_3\cdot(1-\delta)[xLi_2MnO_3\cdot(1-x)Li_dNi_aCo_bAl_cO_2] \quad \text{Formula 5}$$

wherein, in Formula 5, $0<\delta<0.1$, $0\leq x<0.1$, $a+b+c\leq 1$, $0<a<1$, $0<b<1$, $0<c<1$, and $0.95\leq d\leq 1.05$.

The composite according to an embodiment may be a composite positive active material represented by Formula 6.

$$(Li_2MO_3\cdot(1-\delta)Li_dNi_aCo_bM'_cO_2 \quad \text{Formula 6}$$

wherein, in Formula 6,

M is titanium (Ti) or zirconium (Zr);

M' manganese (Mn), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), boron (B), or a combination thereof; and $0<\delta<0.5$, $a+b+c=1$, $0<a<1$, $0<b<1$, $0<c<1$, and $1<d\leq 1.05$.

In Formulae 1 or 6, $\delta$ may be greater than 0 and less than 0.5, for example, from 0.01 to 0.4, or from 0.01 to 0.03. In Formulae 2 to 5, $\delta$ may be greater than 0 and less than 0.1, for example, from 0.01 to 0.03. When $\delta$ is within these ranges, the composite positive active material may have good capacity characteristics and improved structural stability.

In Formulae 1 to 5, a may be from 0.7 to 0.95, or from 0.75 to 0.9, or for example, from 0.8 to 0.92; b may be from 0.01 to 0.15, or from 0.02 to 0.12, or from 0.05 to 0.10; c may be from 0.01 to 0.15, or from 0.02 to 0.12, or from 0.05 to 0.10; and d may be from 0.99 to 1.04, or from 0.99 to 1.03, or from 1 to 1.02. And, in Formula 6, a may be from 0.7 to 0.95, for example, from 0.8 to 0.92, b may be from 0.01 to 0.15, c may be from 0.01 to 0.15, and d may be from 1.01 to 1.04.

When x, a, b, c, and d in Formulae 1 to 6 are within these ranges, the composite positive active material may be structurally stable, and a lithium battery having a positive electrode including the composite positive active material may have improved lifespan and capacity characteristics.

In some embodiments, in Formulae 1 to 6, a may be 0.91, b may be 0.06, and may be 0.03. In some other embodiments, in Formulae 1 to 6, a may be 0.9, b may be 0.05, and c may be 0.05.

In Formula 1, a molar ratio of lithium (Li) to transition metal may be from about 1.015 to about 1.055, or from 1.02 to 1.05, or from 1.025 to 1.045. The transition metal may include each of M, Mn, Ni, Co, and M' in Formula 1.

In some embodiments, the molar ratio of Li to transition metal, and the presence or absence of Li at a tetrahedral site in the composite positive active material may be identified by X-ray diffraction (XRD) analysis and lithium solid-state magic-angle spinning (MAS) nuclear magnetic resonance (NMR), and confirmed by, for example, electron diffractometry using a transmission electron microscope.

The composite represented by Formula 1 may comprise, e.g., consist of $0.01Li_2TiO_3\cdot0.99[0.015Li_2MnO_3\cdot0.985Li_{0.99}Ni_{0.91}Co_{0.06}Mn_{0.015}O_2]$; $0.02Li_2TiO_3\cdot0.98[0.015Li_2MnO_3\cdot0.985Li_{0.99}Ni_{0.91}Co_{0.06}Mn_{0.015}O_2]$; $0.03Li_2TiO_3\cdot0.97[0.015Li_2MnO_3\cdot0.985Li_{0.99}Ni_{0.91}Co_{0.06}Mn_{0.015}O_2]$; $0.01Li_2TiO_3\cdot0.99[0.015Li_2MnO_3\cdot0.985LiNi_{0.91}Co_{0.06}Mn_{0.015}O_2]$; $0.02Li_2TiO_3\cdot0.98[0.015Li_2MnO_3\cdot0.985LiNi_{0.91}Co_{0.06}Mn_{0.015}O_2]$; $0.03Li_2TiO_3\cdot0.97[0.015Li_2MnO_3\cdot0.985LiNi_{0.91}Co_{0.06}Mn_{0.015}O_2]$; $0.01Li_2TiO_3\cdot0.99[0.015Li_2MnO_3\cdot0.985Li_{1.01}Ni_{0.91}Co_{0.06}Mn_{0.015}O_2]$; $0.02Li_2TiO_3\cdot0.98[0.015Li_2MnO_3\cdot0.985Li_{1.01}Ni_{0.91}Co_{0.06}Mn_{0.015}O_2]$; $0.03Li_2TiO_3\cdot0.97[0.015Li_2MnO_3\cdot0.985Li_{1.01}Ni_{0.91}Co_{0.06}Mn_{0.015}O_2]$; $0.01Li_2TiO_3\cdot0.99[0.015Li_2MnO_3\cdot0.985Li_{1.02}Ni_{0.91}Co_{0.06}Mn_{0.015}O_2]$; $0.02Li_2TiO_3\cdot0.98[0.015Li_2MnO_3\cdot0.985Li_{1.02}Ni_{0.91}Co_{0.06}Mn_{0.015}O_2]$; $0.03Li_2TiO_3\cdot0.97[0.015Li_2MnO_3\cdot0.985Li_{1.02}Ni_{0.91}Co_{0.06}Mn_{0.015}O_2]$; $0.01Li_2TiO_3\cdot0.99[0.015Li_2MnO_3\cdot0.985Li_{1.03}Ni_{0.91}Co_{0.06}Mn_{0.015}O_2]$; $0.02Li_2TiO_3\cdot0.98[0.015Li_2MnO_3\cdot0.985Li_{1.03}Ni_{0.91}Co_{0.06}Mn_{0.015}O_2]$; $0.03Li_2TiO_3\cdot0.97[0.015Li_2MnO_3\cdot0.985Li_{1.03}Ni_{0.91}Co_{0.06}Mn_{0.015}O_2]$; $0.01Li_2TiO_3\cdot0.99[0.015Li_2MnO_3\cdot0.985Li_{1.04}Ni_{0.91}Co_{0.06}Mn_{0.015}O_2]$; $0.02Li_2TiO_3\cdot0.98[0.015Li_2MnO_3\cdot0.985Li_{1.04}Ni_{0.91}Co_{0.06}Mn_{0.015}O_2]$; or $0.03Li_2TiO_3\cdot0.97[0.015Li_2MnO_3\cdot0.985Li_{1.04}Ni_{0.91}Co_{0.06}Mn_{0.015}O_2]$.

A combination comprising at least two of the forgoing can be used.

A composite positive active material according to any of the embodiments may include the following three phases as described above: $Li_2TiO_3$, $Li_2MnO_3$, and $LiNiCoM'O_2$ ($LiNiCoMn_0O_2$). The phases may be represented as a combination of the rest of the phases, except for $Li_2TiO_3$, in a single formula for convenience, for example, in the following formulae: $0.01Li_2TiO_3.0.99LiNi_{0.91}Co_{0.06}Mn_{0.03}O_2$; $0.02Li_2TiO_3.0.98LiNi_{0.91}Co_{0.06}Mn_{0.03}O_2$; $0.03Li_2TiO_3.0.97LiNi_{0.91}Co_{0.06}Mn_{0.03}O_2$; $0.01Li_2TiO_3.0.99Li_{1.01}Ni_{0.91}Co_{0.06}Mn_{0.03}O_2$; $0.02Li_2TiO_3.0.98Li_{1.01}Ni_{0.91}Co_{0.06}Mn_{0.03}O_2$; $0.03Li_2TiO_3.0.97Li_{1.01}Ni_{0.91}Co_{0.06}Mn_{0.03}O_2$; $0.01Li_2TiO_3.0.99Li_{1.02}Ni_{0.91}Co_{0.06}Mn_{0.03}O_2$; $0.02Li_2TiO_3.0.98Li_{1.02}Ni_{0.91}Co_{0.06}Mn_{0.03}O_2$; $0.03Li_2TiO_3.0.97Li_{1.02}Ni_{0.91}Co_{0.06}Mn_{0.03}O_2$; $0.01Li_2TiO_3.0.99Li_{1.03}Ni_{0.91}Co_{0.06}Mn_{0.03}O_2$; $0.02Li_2TiO_3.0.98Li_{1.03}Ni_{0.91}Co_{0.06}Mn_{0.03}O_2$; $0.03Li_2TiO_3.0.97Li_{1.03}Ni_{0.91}Co_{0.06}Mn_{0.03}O_2$; $0.01Li_2TiO_3.0.99Li_{1.05}Ni_{0.91}Co_{0.06}Mn_{0.03}O_2$; $0.02Li_2TiO_3.0.98Li_{1.05}Ni_{0.91}Co_{0.06}Mn_{0.03}O_2$; or $0.03Li_2TiO_3.0.97Li_{1.05}Ni_{0.91}Co_{0.06}Mn_{0.03}O_2$.

In general, a composite positive active material under dilithiation conditions has a reduced intensity ratio. The intensity ratio is a ratio of an intensity of a peak corresponding to the (003) face to an intensity of a peak corresponding to the (104) face, which is represented as $(I_{003})/(I_{104})$, and which can be determined by X-ray diffraction analysis. For example, the larger the amount of the transition metal present, the intensity of peak corresponding to the (003) face of a lithium layer is reduced, the ratio $(I_{003})/(I_{104})$ is reduced, and the structural stability of the positive active material is reduced. While not wanting to be bound by theory, it is understood that these changes are due to increased cation mixing.

Without being limited by theory, it is believed that a composite positive active material according to any of the embodiments has a stabilized structure under high-voltage conditions, and consequently, may have improved structural stability, improved lifespan characteristics, and improved rate capability.

FIG. 1A is a phase diagram of an embodiment of a composite positive active material. In FIG. 1A, a triangular region represented by A denotes a composite positive active material including a composite represented by Formula 1: $\delta Li_2TiMO_3.(1-\delta)[xLi_2MnO_3.(1-x)LiNi_aCo_bM'_cO_2]$. In the triangular region represented by A, $\delta$ is ⅛ (i.e., 0.125), wherein $\delta$ denotes the amount of $Li_2TiO_3$.

In some embodiments, the composite positive active material may exhibit a first peak corresponding to $Li_2TiO_3$ having a Li chemical shift at about 0 parts per million (ppm), and a second peak having a chemical shift at about 200 ppm to about 1500 ppm, or about 300 ppm to about 1200 ppm, or about 400 ppm to about 1000 ppm, for example, at about 698.49 ppm or about 687.4846 ppm when analyzed by lithium solid-state nuclear magnetic resonance (NMR) spectroscopy. The second peak corresponds to compounds of the other phases other than $Li_2TiO_3$ in the composite positive active material represented by Formula 1. A content ratio of $Li_2MO_3$ in the composite positive active material of Formula 1 may be obtained by integrating the first and second peaks.

In some embodiments, the composite positive active material may have an intensity ratio of a peak of a (003) face to a peak of a (104) face of about 1.54 to about 1.64, or about 1.56 to about 1.62, for example, about 1.58 to about 1.60, as analyzed by X-ray diffraction analysis with Cu-kα radiation, wherein the peak of the (003) face may be at a diffraction angle 2θ of about 18° to about 19° 2θ, and the peak of the (104) face may be at a diffraction angle 2θ of about 43° to about 44° 2θ. The intensity ratio of the peak of the (003) face to the peak of the (104) face may indicate a development condition, e.g., degree of crystallinity, of the layered structure of the composite positive active material.

In some embodiments, the composite positive active material has a peak at a diffraction angle 2θ of about 18° to about 19° 2θ and a full width half maximum of the peak may be in a range of about 0.2° to about 0.28° 2θ.

Primary particles of the composite positive active material may have a particle size of from about 100 nanometers (nm) to about 300 nm. When the primary particle size of the composite positive active material is within this range, this may lead to facilitated migration of lithium ions and suppressed side reaction with electrolyte.

As used herein, the term "particle size" of primary particles may refer to an average particle diameter when the primary particles of the composite positive active material are spherical, or to an average length of the major axis when the primary particles are non-spherical. Particle size may be determined by light scattering, for example.

In some embodiments, the composite positive active material may have a layered crystalline phase that belongs to the Space Group R-3m and have crystallographic symmetry and regularity. The crystallographic symmetry and regularity of the composite positive active material may be confirmed by X-ray diffraction or transmission electron microscope (TEM) analysis. As used herein, the term "crystallographic symmetry and regularity" refers to an orientation in which crystalline symmetry is maintained throughout the entire composite positive active material, and that the crystalline characteristics are entirely regular and uniform.

A lithium transition metal oxide ($LiMO_2$) having a layered structure has an ion bonding crystal structure that is very compact. Oxygen ions, with the largest ion radius, form a compact layer and lithium ions and transition metal ions are arranged in the empty spaces between the oxygen ions, thereby increasing a packing density of the lithium transition metal oxide. The composite positive active material includes an alternating arrangement of a transition metal oxide ($MO_2$) layer formed of transition metal ions and e oxygen ions and an oxygen octahedral layer covering the lithium ions.

Strong ion bonds may be formed within the $MO_2$ layer, and Coulomb repulsion forces may be generated between the $MO_2$ layer and another $MO_2$ layer, which may allow intercalation and deintercalation of lithium ions in the $MO_2$ layer. The lithium ions may diffuse along a 2-dimensional plane, and thus, the lithium transition metal oxide may have a high ion conductivity.

However, when lithium ions escape from the crystal structure layer during a charging process, the crystals may expand in a direction of a c-axis due to repulsion between oxygen atoms in the $MO_2$ layer. When the lithium ions are deintercalated from the crystal structure, the crystals may rapidly contract in a direction of a c-axis and thus various changes in a phase of the crystals may occur. In this regard, structural stability of the active material may significantly deteriorate.

In order to resolve the deterioration in structural stability, the present inventors have advantageously discovered a composite positive active material having an integrated structure in which $Li_2TiO_3$ or $Li_2ZrO_3$ having a layered structure is intermixed with $LiMO_2$ and $Li_2MnO_3$ having a layered structure. $Li_2MnO_3$, which may be activated at about 4.35 volts (V), may be precipitated on a negative electrode due to voltage decay and subsequent dissolution of manganese. However, a composite positive active material according to any of the embodiments may have improved structural stability by integrating an inactive material $Li_2TiO_3$ or $Li_2ZrO_3$ with $LiMO_2$ and $Li_2MnO_3$. When using such a composite positive active material according to an embodiment, a positive electrode of a lithium battery may have improved structural stability against high-voltage charging, and the lithium battery may have improved lifespan characteristics and improved voltage characteristics.

In some embodiments, in the composite positive active material, a cation mixing ratio may be about 10 percent (%) or lower, or about 8% or lower, or about 7.5% or lower, or, for example, in a range of about 1% to about 10%, or from about 5% to about 10%, or from about 5% to about 7.5%, based on the total amount of lithium sites in the lithium layer. When the composite positive active material has a cation mixing ratio within these ranges, a crystalline structure of the active material may be stabilized even under high-voltage conditions, which prevents the crystalline structure from being destroyed by intercalation and deintercalation of lithium, and thus a lithium battery including the composite positive active material may have good capacity characteristics and improved stability. A lithium battery including the composite positive active material may also have improved structural stability and good lifespan characteristics.

The percent cation mixing is percentage based on an intensity ratio of a peak corresponding to the (003) face (i.e., a peak at a diffraction angle 2θ of about 18° to about 19° 2θ) and a peak corresponding to the (104) face (i.e., a peak at a diffraction angle 2θ of about 43° to about 45° 2θ), and is determined using Equation 1 below.

Percent cation mixing=$\{I_{(104)}/I_{(003)}\} \times 100\%$     Equation 1

In Equation 1, $I_{(003)}$ denotes an intensity of the peak corresponding to the (003) face, and $I_{(104)}$ denotes an intensity of the peak corresponding to the (104) face.

The peak corresponding to the (003) face may provide information about a layered structure of the composite positive active material, and the peak corresponding to the (104) face may provide information about a layered and cubic rock-salt structure of the composite positive active material. As it apparent from Equation 1, as $I_{(003)}/I_{(104)}$ increases, a cation mixing ratio decreases.

In some embodiments, in the composite positive active material, the peak corresponding to the (003) face at a diffraction angle 2θ of about 18° to about 19° 2θ has a full width at half maximum (FWHM) in a range of about 0.2° to about 0.28° 2θ, as analyzed by X-ray diffraction analysis with Cu-kα radiation. A the peak corresponding to the (104) face at a diffraction angle 2θ of about 43° to about 45° 2θ, for example, about 44.5° 2θ, has a FWHM in a range of about 0.25° to about 0.33° 2θ.

The composition of a composite positive active material according to any of the embodiments may be determined by X-ray diffraction analysis.

An average particle size of secondary particles in the composite positive active material may be in a range of about 10 nanometers (nm) to about 500 micrometers (μm), for example, about 20 nm to about 100 μm, or about 1 μm to about 30 μm. When an average particle size of secondary particles of the composite positive active material is within these ranges, a lithium battery including the composite positive active material may have improved physical properties.

In some embodiments, a tap density of the composite positive active material may be in a range of about 0.5 grams per cubic centimeter (g/cm³) to about 3 g/cm³. When a tap density of the composite positive active material is within this range, a lithium battery including the composite positive active material may have improved voltage characteristics and lifespan characteristics.

A coating layer may be formed on a surface of the composite positive active material. In this regard, when an additional coating layer is present on the surface of the composite positive active material, a lithium battery including a positive electrode including the composite positive active material may have improved charging and discharging characteristics, improved lifespan characteristics, and high-voltage characteristics.

In some embodiments, the coating layer may include a conductive material, a metal oxide, an inorganic fluoride, or a combination thereof.

The conductive material may include a carbonaceous material, a conductive polymer, an indium tin oxide (ITO), $RuO_2$, ZnO, or a combination thereof.

The carbonaceous material may be crystalline carbon, amorphous carbon, or a mixture thereof. Examples of the crystalline carbon may include graphite, such as natural graphite or artificial graphite, and the graphite may be in non-shaped, disk-shaped, flake, spherical, or fibrous form. Examples of the amorphous carbon may include soft carbon (i.e., carbon sintered at low temperature), hard carbon, a meso-phase pitch carbonization product, sintered coke, graphene, carbon black, fullerene soot, carbon nanotubes, carbon fibers, or a combination thereof. However, embodiments are not limited thereto, and any suitable crystalline carbon or amorphous carbon may be used.

Examples of the carbonaceous material may include carbon nanotubes, fullerene, graphene, carbon fibers, or a combination thereof. Examples of the conductive polymer may include polyaniline, polythiophene, polypyrrole, or a combination thereof.

The metal oxide may include silica ($SiO_2$), alumina ($Al_2O_3$), zirconium oxide ($ZrO_2$), titanium oxide ($TiO_2$), or a combination thereof.

The inorganic fluoride may include $AlF_3$, CsF, KF, LiF, NaF, RbF, $TiF_4$, AgF, AgF☐, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $VF_4$, $ZrF_4$, $NbF_5$, $SbF_5$, $TaF_5$, $BiF_5$, $MoF_6$, $ReF_6$, $SF_6$, $WF_6$, or a combination thereof.

In some embodiments, the coating layer may include a coating element compound, such as an oxide of a coating element, a hydroxide of a coating element, an oxyhydroxide of a coating element, an oxycarbonate of a coating element, a hydroxycarbonate of a coating element, or a combination thereof. A compound forming the coating layer may be amorphous or crystalline. A coating element in the coating element compound may include Sc, Y, Nb, Cr, Mo, W, Mn, Fe, B, In, C, Sb, La, Ce, Sm, Gd, Mg, Al, Co, K, Na, Ca, Si, Ti, V, Sn, Ge, Ga, B, As, Zr, or a combination thereof. A coating layer formation process may be include any method suitable for coating the coating element compound on the positive active material, as long as the method does not negatively affect the physical properties of the positive active material. For example, the coating method may include a spray coating method or a dipping method. As such coating methods are known to in the art, a description thereof is omitted herein.

The coating layer is disposed on a surface of the positive active material. In some embodiments, the coating layer may be a continuous layer or a discontinuous layer. An example of a discontinuous coating layer is a layer of an island type.

In a composite positive active material according to an embodiment, $Li_2MO_3$ may be electrochemically inactive with respect to lithium in a voltage range of about 4.0 V to about 4.5 V. The $Li_2MO_3$ may be, for example, $Li_2TiO_3$, which is inactive in a high voltage range, and thus contributes to higher structural stability of the composite positive active material. According to another aspect of an embodiment, a method of preparing a composite positive active material is provided.

A method of preparing a composite positive active material is not particularly limited and may be, for example, a co-precipitation method or a solid-phase method.

First, the co-precipitation method will be described hereinafter. When the composite positive active material is prepared using a co-precipitation method, the composite positive active material may have a uniform composition.

A metal compound selected from a metal hydroxide represented by Formula a, a metal carbonate represented by Formula b, and a metal oxalate represented by Formula c or Formula d may be mixed to prepare a precursor mixture. A precipitating agent may be added to the precursor mixture to obtain a precipitate. Following washing and drying, the precipitate is mixed with a lithium compound and an M precursor to prepare a precipitate mixture, and the resulting precipitate mixture may be heat-treated in air or in an oxygen atmosphere at a temperature in a range of about 400° C. to about 1200° C. to obtain a composite positive active material represented by Formula 1.

$$Ni_aCo_bM'_c(OH)_2 \quad \text{Formula a}$$

In Formula a, M', a, b and c may be defined the same as in Formula 1.

$$Ni_aCo_bM'_cCO_3 \quad \text{Formula b}$$

In Formula b, M', a, b and c may be defined the same as in Formula 1.

$$Ni_aCo_bM'_cOC(=O)C(=O)O \quad \text{Formula c}$$

$$Ni_aCo_bM'_c(C_2O_4) \quad \text{Formula d}$$

In Formulae c and d, M', a, b and c may be defined the same as in Formula 1.

Any of the metal hydroxide represented by Formula a, the metal carbonate represented by Formula b, and the metal oxalate represented by Formula c or Formula d may be used. However, when a metal oxalate represented by Formula d is used, it may be easy to stoichiometrically control the amounts of starting materials and prepare a composite positive active material having a target composition.

Examples of the lithium compound may include a lithium carbonate ($Li_2CO_3$), a lithium sulfate ($Li_2SO_4$), a lithium nitrate ($LiNO_3$), and a lithium hydroxide (LiOH). The lithium compound may be stoichiometrically mixed with a metal compound represented by one of Formulae a to d to obtain the composite positive active material having a composition represented by Formula 3.

The M precursor may be, for example, a titanium precursor or a zirconium precursor. The titanium precursor may be, for example, titanium oxide ($TiO_2$). The zirconium precursor may be, for example, zirconium oxide ($ZrO_2$).

The heat-treatment may be performed in air or an oxygen atmosphere at a temperature in a range of about 400° C. to about 1200° C., or from about 500° C. to about 1100° C., or from about 600° C. to about 1000° C., for example, at about 900° C., to obtain a composite positive active material represented by Formula 1. The time of the heat-treatment may vary depending on the heat treatment temperature. For example, the heat-treatment may be performed for about 20 hours or less, for example about 30 minutes to about 20 hours.

The compounds represented by Formulae a to d may be obtained according to the following processes.

A nickel precursor, a cobalt precursor, an M' precursor, and a solvent may be mixed to obtain a precursor mixture. For example, water or an alcohol solvent may be used as the solvent. The alcohol solvent may be, for example, ethanol, but is not limited thereto.

The amount of the solvent may be about 200 parts to about 3000 parts by weight, or about 200 to about 2500 parts by weight, or about 200 to about 1000 parts by weight, based on 100 parts by weight of a total amount of the nickel precursor, the cobalt precursor, and the M' precursor. When the amount of the solvent is within these ranges, a uniform mixture of the nickel precursor, the cobalt precursor, and the M' precursor may be obtained. The mixing may be performed at a temperature in a range of about 20° C. to about 80° C., or for example, at about 65° C.

The nickel precursor may be, for example, a nickel sulfate, a nickel nitrate, or a nickel chloride. These examples of the nickel precursor may also apply to the cobalt precursor and the M' precursor, except that nickel in each of the examples is replaced by cobalt or M'.

For example, the M' precursor may be a manganese precursor, an aluminum precursor, or the like.

The cobalt precursor may be, for example, a cobalt sulfate, a cobalt nitrate, a cobalt chloride, or a combination thereof. The manganese precursor may be, for example, a manganese sulfate, a manganese nitrate, a manganese chloride, or a combination thereof. The nickel precursor may be, for example, a nickel sulfate, a nickel nitrate, a nickel chloride, or a combination thereof. The aluminum precursor may be, for example, an aluminum sulfate, an aluminum nitrate, an aluminum chloride, or a combination thereof.

A precipitating agent including a chelating agent, a pH adjusting agent, or a combination thereof, may be added to the precursor mixture to obtain a precipitate through a co-precipitation reaction. The precipitate thus obtained may be filtered and heat-treated. The heat-treatment of the precipitate may be performed at a temperature in a range of about 20° C. to about 110° C., or about 30° C. to about 100° C., or about 50° C. to 90° C., for example, at about 80° C. When the heat-treatment temperature is within these ranges, reactivity of the co-precipitation reaction may be good.

The chelating agent may control a reaction rate of forming the precipitate.

Examples of the chelating agent may include ammonium hydroxide ($NH_4OH$) and citric acid. The amount of the chelating agent may be determined by one of skill in the art without undue experimentation.

The pH adjusting agent may control the pH of the reaction mixture to be in a range of 6 to 12. Examples of the pH adjusting agent may include ammonium hydroxide, sodium hydroxide (NaOH), sodium carbonate ($Na_2CO_3$), sodium oxalate ($Na_2C_2O_4$), or a combination thereof.

When sodium hydroxide is used as the pH adjusting agent (e.g., a precipitating agent), a precipitate of a metal hydroxide represented by Formula a may be obtained.

When the sodium carbonate is used as the pH adjusting agent, precipitate of a metal carbonate represented by Formula b may be obtained. When the sodium oxalate is used as the pH adjusting agent, a precipitate of a metal oxalate represented by Formula d may be obtained.

For example, a metal compound selected from the metal hydroxide represented by Formula a, the metal carbonate represented by Formula b, and the metal oxalate represented by Formula c or Formula d, may be a compound represented by Formula e or f.

   Formula e

In Formula e, $0<a<1$, $0<b<1$, $0<c<1$, $a+b+c=1$, and X may be —OH, —$CO_3$, or —$C_2O_4$.

   Formula f

In Formula f, $0<a<1$, $0<b<1$, $0<c<1$, $a+b+c=1$, and X may be —OH, —$CO_3$, or —$C_2O_4$.

A composite positive active material according to any of the embodiments may also be prepared by a spray pyrolysis method or a solid-phase method, in addition to the above-describe co-precipitation method.

Hereinafter, a method of preparing a composite positive active material using a solid-phase method will be described.

An M precursor, a Ni precursor, a Co precursor and a Mn precursor are mixed to obtain a precursor mixture.

The mixing may be performed by a mechanical mixing method. For example, the mechanical mixing method may be performed by using a ball mill, a Banbury mixer, or a homogenizer. The mechanical mixing may be performed using, for example, zirconia balls. The mechanical mixing time may vary. For example, the mechanical mixing time may be in a range of about 20 minutes to about 10 hours, or about 20 minutes to about 5 hours, or for example, 30 minutes to about 3 hours.

An alcohol solvent may be added during the mechanical mixing to increase a mixing efficiency. The alcohol solvent may include, for example, ethanol, but is not limited thereto.

The amount of the solvent may be about 100 parts to about 3000 parts by weight, or about 200 to about 2500 parts by weight, or about 200 to about 1000 parts by weight, based on 100 parts by weight of a total amount of the nickel precursor, the cobalt precursor, the manganese precursor, and the M' precursor. When the amount of the solvent is within this range, the precursors may be homogenously mixed in the solvent.

The nickel precursor may be, for example, nickel hydroxide, nickel oxide, or nickel carbonate. Likewise, these examples of the nickel precursor may also apply to the cobalt precursor, the manganese precursor and the M' precursor, except that nickel is replaced by cobalt, manganese or M'.

Then, the precursor mixture may be heat-treated at a temperature in a range of about 400° C. to about 1200° C., or from about 500° C. to about 1100° C., or from about 600° C. to about 1000° C. The precursor mixture may be dried through the heat-treatment process.

The heat-treated precursor mixture, obtained through the above-described processes, may be mixed with a lithium compound and an M' precursor, and then heat-treated to obtain the composite positive active material represented by Formula 1, according to an embodiment. The lithium compound and M' precursor may be similar materials as those described above in connection with the co-precipitation method. The amounts of the lithium compound and M' precursor may be controlled to obtain the composite positive active material having a target composition represented by Formula 1.

The heat-treatment may be performed in air or an oxygen atmosphere at a temperature in a range of, for example, about 650° C. to about 900° C., or about 700° C. to about 850° C., or about 700° C. to about 800° C. The heat-treatment time may vary depending on the heat-treatment temperature. For example, the heat-treatment may be performed for about 3 hours to about 20 hours, or about 5 hours to about 15 hours, or about 5 hours to about 10 hours.

According to another aspect of an embodiment, a positive electrode includes a composite positive active material according to any of the above-described embodiments.

According to another aspect of an embodiment, a lithium battery includes the positive electrode.

A positive electrode according to an embodiment may be prepared according to the following method.

A positive active material, a binder, and a solvent may be mixed to prepare a positive active material composition.

A conducting agent may be further added to the positive active material composition.

The positive active material composition may be directly coated on a metal current collector and dried to prepare a positive electrode. Alternatively, the positive active material composition may be cast on a separate support to form a film. This film may then be detached from the support and laminated on a metal current collector to prepare a positive electrode.

The positive active material may be a composite positive active material according to an embodiment.

The positive electrode may optionally further include a first positive active material in addition to the composite positive active material according to an embodiment.

The first positive active material may include a lithium cobalt oxide, a lithium nickel cobalt manganese oxide, a lithium nickel cobalt aluminum oxide, a lithium iron phosphate oxide, a lithium manganese oxide, or a combination thereof. However, embodiments are not limited thereto, and any suitable positive active material available may be used.

For example, the first positive active material may be a compound represented by the following formulae: $Li_aA_{1-b}B'_bD_2$ (wherein $0.90 \leq a \leq 1.8$, and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$, and $0 \leq c \leq 0.05$); $Li_aNi_{1-b-c}Co_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); $LiFePO_4$, or a combination thereof.

In the above formulae, A may be Ni, Co, Mn, or a combination thereof; B' may be Al, Ni, Co, Mn, Cr, Fe, Mg, Sr, V, a rare earth element, or a combination thereof; D may be O, F, S, P, or a combination thereof; E may be Co, Mn, or a combination thereof; F' may be F, S, P, or a combination thereof; G may be Al, Cr, Mn, Fe, Mg, La, Ce, Sr, V, or a combination thereof; Q may be Ti, Mo, Mn, or a combination thereof; I' may be Cr, V, Fe, Sc, Y, or a combination thereof; and J may be V, Cr, Mn, Co, Ni, Cu, or a combination thereof.

Examples of the conducting agent may include carbon black, graphite particles, natural graphite, artificial graphite, acetylene black, Ketjen black, carbon fibers, carbon nanotubes, metal powders, metal fibers, or metal tubes of copper, nickel, aluminum, silver, or the like, or conductive polymers such as polyphenylene derivatives. A combination comprising at least two of the foregoing conducting agents may also be used. However, embodiments are not limited thereto. Any suitable conducting agent may be used.

Examples of the binder may include vinylidene fluoride/hexafluoropropylene copolymers, polyvinylidene fluoride, polyimide, polyethylene, polyester, polyacrylonitrile, polymethylmethacrylate, polytetrafluoroethylene (PTFE), carboxymethyl cellulose/styrene-butadiene rubber (CMC/SBR) copolymers, styrene butadiene rubber based polymers, or a combination thereof.

Examples of the solvent may include N-methylpyrrolidone, acetone, water, or a combination thereof. However, embodiments are not limited thereto. Any suitable solvent available may be used.

The amounts of the composite positive active material, the conducting agent, the binder, and the solvent may be determined by one of ordinary skill in the art without undue experimentation. One or more of the conducting agent, the binder, and the solvent may or may not be used depending on the use and the structure of the lithium battery.

A negative electrode may be obtained in substantially the same manner as in the preparation process for the positive electrode, except that a negative electrode active material is used instead of the positive active material.

Examples of the negative electrode active material may include a carbonaceous material, silicon, a silicon oxide, a silicon-based alloy, a silicon-carbon composite, tin, a tin-based alloy, a tin-carbon composite, a metal oxide, or a combination thereof.

The carbonaceous material may be crystalline carbon, amorphous carbon, or a combination thereof. Examples of the crystalline carbon may include graphite such as natural graphite or artificial graphite in amorphous, disk-shaped, flake, spherical, or fibrous form. Examples of the amorphous carbon may include soft carbon (carbon sintered at low temperature), hard carbon, meso-phase pitch carbonization product, sintered coke, graphene, carbon black, fullerene soot, carbon nanotubes, carbon fibers, or a combination thereof. However, embodiments are not limited thereto. Any material suitable for use as the crystalline carbon or the amorphous carbon may be used.

The negative electrode active material may be selected from Si, $SiO_x$ (wherein $0<x<2$, for example, $0.5<x<1.5$), Sn, $SnO_2$, a silicon-containing metal alloy, or a combination thereof. The silicon-containing metal alloy includes Si and element including Al, Sn, Ag, Fe, Bi, Mg, Zn, In, Ge, Pb, Ti, or a combination thereof.

The negative electrode active material may include a metal/metalloid alloyable with lithium, an alloy thereof, or an oxide thereof. For example, the metal/metalloid alloyable with lithium may be Si, Sn, Al, Ge, Pb, Bi, a Sb, a Si—Y' alloy (wherein Y' may be an alkali metal, an alkali earth metal, a Group 13 to Group 16 element, a transition metal, a rare earth element, or a combination thereof; but not Si), a Sn—Y' alloy (wherein Y' may be an alkali metal, an alkali earth metal, a Group 13 to Group 16 element, a transition metal, a rare earth element, or a combination thereof; but not Sn), $MnO_x$ (wherein $0<x\leq2$), or a combination thereof. Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. Examples of the oxide of the metal/metalloid alloyable with lithium are a lithium titanium oxide, a vanadium oxide, a lithium vanadium oxide, $SnO_2$, $SiO_x$ (wherein $0<x<2$), or a combination thereof.

For example, the negative electrode active material may include a Group 13 to Group 16 element, or a combination thereof.

For example, the negative electrode active material may include Si, Ge, Sn, or a combination thereof.

The negative electrode according to the present disclosure includes a lithium metal electrode or a lithium metal alloy electrode.

The lithium metal alloy may include a lithium metal and a metal/metalloid alloyable with lithium metal or an oxide of the metal/metalloid. Examples of the metal/metalloid alloyable with lithium metal or an oxide of thereof include Si, Sn, Al, Ge, Pb, Bi, Sb, a Si—Y' alloy (wherein Y' may be an alkaline metal, an alkaline earth metal, a Group 13 to 16 element, a transition metal, a rare earth element, or a combination thereof, except for Si), a Sn—Y' alloy (wherein Y' may be an alkaline metal, an alkaline earth metal, a Group 13 to 16 element, a transition metal, a rare earth element, or a combination thereof, except for Sn), $MnO_x$ (wherein $0<x\leq2$), or a combination thereof.

Y' may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. For example, the oxide of a metal/metalloid alloyable with lithium metal may be a lithium titanium oxide, a vanadium oxide, a lithium vanadium oxide, $SnO_2$, $SiO_x$ (wherein $0<x<2$), or the like, or a combination thereof.

The negative electrode according to the present disclosure includes a lithium metal electrode or a lithium metal alloy electrode. Alternatively, the negative electrode according to the present disclosure includes a negative electrode active material including a carbon-based material, silicone, silicon oxide, a silicon alloy, a silicon-carbon material composite, Sn, an Sn-based alloy, an Sn-carbon composite, a metal oxide, or a combination thereof.

The amounts of the negative electrode active material, the conducting agent, the binder, and the solvent may be determined by one of ordinary skill in the art without undue experimentation.

A separator may be disposed between the positive electrode and the negative electrode. The separator may be an insulating thin film having high ion permeability and mechanical strength.

In general, the separator may have a pore diameter of about 0.01 μm to about 10 μm and a thickness of about 5 μm to about 20 μm. The separator may be sheet or non-woven fabric including an olefin-based polymer such as polypropylene, or polyethylene or glass fibers. When a solid polymer electrolyte is used as an electrolyte, the solid polymer electrolyte may also serve as a separator.

Examples of the olefin-based polymer as a material for forming the separator may include polyethylene, polypropylene, polyvinylidene, fluoride, or a multi-layer film having two or more layers including thereof. The separator may be a mixed multi-layer such as a two-layer separator of polyethylene/polypropylene, a three-layer separator of polyethylene/polypropylene/polyethylene, or a three-layer separator of polypropylene/polyethylene/polypropylene.

A lithium salt-containing non-aqueous electrolyte may include a non-aqueous electrolyte and a lithium salt.

Examples of the non-aqueous electrolyte may include a non-aqueous liquid electrolyte solution, an organic solid electrolyte, and an inorganic solid electrolyte.

The non-aqueous liquid electrolyte may include an organic solvent. Any suitable organic solvent may be used as the organic solvent in the non-aqueous liquid electrolyte. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N, N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, dimethylether, or a combination thereof.

Examples of the organic solid electrolyte may include a polyethylene derivative, a polyethylene oxide derivative, a polypropylene oxide derivative, a phosphate ester polymer, polyester sulfide, polyvinyl alcohol, polyvinylidene fluoride, a polymer including an ionic dissociation group, or a combination thereof.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or a combination thereof.

The lithium salt may be a material that may easily dissolve in the non-aqueous electrolyte. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y may be natural numbers), $LiCl$, $LiI$, or a combination thereof. To improve the charging/discharging characteristics and flame retardancy, the non-aqueous electrolyte may further include, for example, pyridine, triethylphosphate, triethanolamine, cyclic ether, ethylenediamine, n-glyme, hexamethyl phosphoamide, a nitrobenzene derivative, sulfur, quinone imine dye, N-substituted oxazolidinone, N,N-substituted imidazolidine, ethyleneglycol dialkylether, ammonium salt, pyrrole, 2-methoxy ethanol, aluminum trichloride, or a combination thereof. Optionally, to impart non-flammability, a halogen-containing solvent such as carbon tetrachloride and/or ethylene trifluoride may be further added to the non-aqueous electrolyte.

Figure 1B:
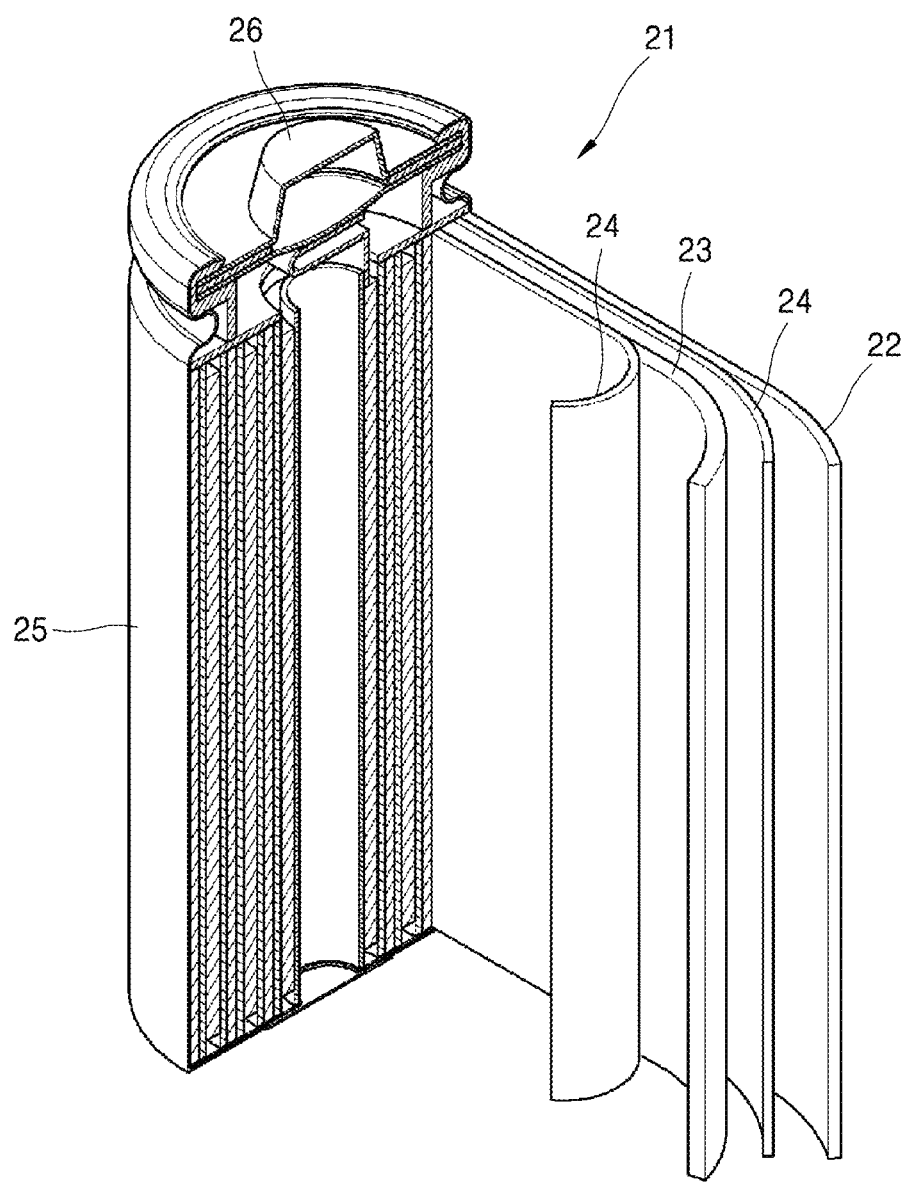
FIG. 1B is an exploded perspective view of an embodiment of a lithium battery.

Referring to FIG. 1B, a lithium battery 21 according to an embodiment may include a positive electrode 23, a negative electrode 22, and a separator 24. The positive electrode 23, the negative electrode 22, and the separator 24 may be wound or folded, and then accommodated in a battery case 25. Then, the battery case 25 may be filled with an organic electrolyte solution and sealed with a cap assembly 26, thereby completing the manufacture of the lithium battery 21. The battery case 25 may be of a cylindrical type, a rectangular type, or a thin-film type. For example, the lithium battery 21 may be a thin-film type battery. The lithium battery 21 may be a lithium ion battery.

The separator 24 may be disposed between the positive electrode 23 and the negative electrode 22 to form a battery assembly. Alternatively, the battery assembly may be stacked in a bi-cell structure and impregnated with an organic electrolyte solution. The resultant may be put into a pouch and sealed, thereby completing the manufacture of a lithium ion polymer battery.

In some embodiments, a plurality of battery assemblies may be stacked upon one another to form a battery pack. This battery pack may be used in any device in need of high capacity and high output, for example, in a laptop computer, a smart phone, and an electric vehicle.

Charging/discharging test results for a half-cell battery including the positive electrode including the composite positive active material according to an embodiment and lithium as a counter metal, show that the composite positive active material has redox peaks within a range of about 2.0 V to about 3.0 V vs lithium as shown in a graph of lithium and a value (dQ/dV, a vertical axis) versus voltage (V, a horizontal axis) during the charging/discharging of the battery.

The lithium battery may have a driving voltage of about 4.5 V or higher, and thus may have improved lifespan and voltage retention characteristics even at a high voltage.

Therefore, the lithium battery may be applicable in an electric vehicle (EV), for example, in a hybrid electric vehicle such as a plug-in hybrid electric vehicle (PHEV).

One or more embodiments of the present disclosure will now be described in detail with reference to the following examples. However, these examples are only for illustrative purposes and are not intended to limit the scope of the one or more embodiments of the present disclosure.

EXAMPLES

Example 1: Preparation of Composite Positive Active Material $(0.01Li_2TiO_3 \cdot 0.99LiNi_{0.91}Co_{0.06}Mn_{0.03}O_2)$ $(0.01Li_2TiO_3 \cdot 0.99 [0.015Li_2MnO_3 \cdot 0.985Li_{0.99}Ni_{0.91}Co_{0.06}Mn_{0.0015}O_2])$ A composite positive active material was synthesized by a co-precipitation method as follows.

As starting materials, a nickel sulfate, a cobalt sulfate, and a manganese sulfate were stoichiometrically mixed so as to obtain a composite positive active material $(0.01Li_2TiO_3 \cdot 0.99LiNi_{0.91}Co_{0.06}Mn_{0.03}O_2)(0.01Li_2TiO_3 \cdot 0.99[0.015Li_2MnO_3 \cdot 0.985Li_{0.99}Ni_{0.91}Co_{0.06}Mn_{0.015}O_2])$.

The nickel sulfate, the cobalt sulfate, and the manganese sulfate were dissolved in distilled water at a concentration of 2 molar (M) to obtain a precursor mixture. A sodium hydroxide as a precipitating agent was added to the precursor mixture, and a co-precipitation reaction proceeded at 65° C. for 4 hours to obtain a precipitate $Ni_{0.91}Co_{0.06}Mn_{0.03}(OH)_2$.

The resulting precipitate was washed with distilled water, dried at 80° C. for 24 hours, and mixed with ethanol, lithium hydroxide $(Li(OH) \cdot H_2O)$, and titanium oxide $(TiO_2)$. The lithium hydroxide and the titanium oxide were stoichiometrically mixed so as to obtain the composite positive active material $(0.01Li_2TiO_3 \cdot 0.99LiNi_{0.91}Co_{0.06}Mn_{0.03}O_2)$ $(0.01Li_2TiO_3 \cdot 0.99[0.015Li_2MnO_3 \cdot 0.985Li_{0.99}Ni_{0.91}Co_{0.06}Mn_{0.015}O_2])$.

The resulting mixture was heat-treated in air at about 750° C. for about 12 hours to thereby obtain the target composite positive active material $(0.01Li_2TiO_3 \cdot 0.99LiNi_{0.91}Co_{0.06}Mn_{0.03}O_2)(0.01Li_2TiO_3 \cdot 0.99[0.015Li_2MnO_3 \cdot 0.985Li_{0.99}Ni_{0.91}Co_{0.06}Mn_{0.015}O_2])$.

Example 2: Preparation of Composite Positive Active Material $(0.02Li_2TiO_3 \cdot 0.98LiNi_{0.91}Co_{0.06}Mn_{0.03}O_2)$ $(0.02Li_2TiO_3 \cdot 0.98[0.015Li_2MnO_3 \cdot 0.985Li_{0.99}Ni_{0.91}Co_{0.06}Mn_{0.015}O_2])$ A composite positive active material $(0.01Li_2TiO_3 \cdot 0.99LiNi_{0.91}Co_{0.06}Mn_{0.03}O_2)(0.02Li_2TiO_3 \cdot 0.98[0.015Li_2MnO_3 \cdot 0.985Li_{0.99}Ni_{0.91}Co_{0.06}Mn_{0.015}O_2])$ was prepared in the same manner as in Example 1, except that the amounts of nickel sulfate, cobalt sulfate, manganese sulfate, and lithium hydroxide used as starting materials were changed so as to obtain the composite positive active material $(0.02Li_2TiO_3 \cdot 0.98Li Ni_{0.91}Co_{0.06}Mn_{0.03}O_2)(0.02Li_2TiO_3 \cdot 0.98[0.015Li_2MnO_3 \cdot 0.985Li_{0.99}Ni_{0.91}Co_{0.06}Mn_{0.015}O_2])$.

Example 3: Preparation of Composite Positive Active Material $(0.03Li_2TiO_3 \cdot 0.97LiNi_{0.91}Co_{0.06}Mn_{0.03}O_2)$ $(0.03Li_2TiO_3 \cdot 0.97[0.015Li_2MnO_3 \cdot 0.985Li_{0.99}Ni_{0.91}Co_{0.06}Mn_{0.015}O_2])$ A composite positive active material $(0.03Li_2TiO_{3 \cdot 0.97[0.015}Li_2Mn_{0.03} \cdot 0.985Li_{0.99}Ni_{0.91}Co_{0.06}Mn_{0.015}O_2])$ was prepared in the same manner as in Example 1, except that the amounts of nickel sulfate, cobalt sulfate, manganese sulfate, and lithium hydroxide used as starting materials were changed so as to obtain the composite positive active material $(0.03Li_2TiO_3 \cdot 0.97[0.015Li_2MnO_3 \cdot 0.985Li_{0.99}Ni_{0.91}Co_{0.06}Mn_{0.015}O_2])$.

Example 4: Preparation of Composite Positive Active Material $(0.01Li_2TiO_3 \cdot 0.99Li_{1.01}Ni_{0.91}Co_{0.06}Mn_{0.03}O_2)$ $(0.01Li_2TiO_3 \cdot 0.99[0.015Li_2MnO_3 \cdot 0.985LiNi_{0.91}Co_{0.06}Mn_{0.015}O_2])$ A composite positive active material $(0.01Li_2TiO_3 \cdot 0.99Li_{1.01}Ni_{0.91}Co_{0.06}Mn_{0.03}O_2)$ $(0.01Li_2TiO_3 \cdot 0.99[0.015Li_2MnO_3 \cdot 0.985LiNi_{0.91}Co_{0.06}Mn_{0.015}O_2])$ was obtained in the same manner as in Example 1, except that the amounts of nickel sulfate, cobalt sulfate, manganese sulfate, and lithium hydroxide used as starting materials were changed so as to obtain the composite positive active material $(0.01Li_2TiO_3 \cdot 0.99Li_{1.01}Ni_{0.91}Co_{0.06}Mn_{0.03}O_2)$ $(0.01Li_2TiO_3 \cdot 0.99[0.015Li_2MnO_3 \cdot 0.985LiNi_{0.91}Co_{0.06}Mn_{0.015}O_2])$.

Example 5: Preparation of Composite Positive Active Material $(0.01Li_2TiO_3 \cdot 0.99Li_{1.02}Ni_{0.91}Co_{0.06}Mn_{0.03}O_2)$ $(0.01Li_2TiO_3 \cdot 0.99[0.015Li_2MnO_3 \cdot 0.985Li_{1.01}Ni_{0.91}Co_{0.06}Mn_{0.015}O_2])$ A composite positive active material $(0.01Li_2TiO_3 \cdot 0.99Li_{1.02}Ni_{0.91}Co_{0.06}Mn_{0.03}O_2)$ was prepared in the same manner as in Example 1, except that the amounts of nickel sulfate, cobalt sulfate, manganese sulfate, and lithium hydroxide used as starting materials were changed so as to obtain the composite positive active material $(0.01Li_2TiO_3 \cdot 0.99Li_{1.02}Ni_{0.91}Co_{0.06}Mn_{0.03}O_2)$.

Example 6: Preparation of Composite Positive Active Material $(0.01Li_2TiO_3 \cdot 0.99Li_{1.03}Ni_{0.91}Co_{0.06}Mn_{0.03}O_2)$ $(0.01Li_2TiO_3 \cdot 0.99[0.015Li_2MnO_3 \cdot 0.985Li_{1.02}Ni_{0.91}Co_{0.06}Mn_{0.015}O_2])$ A composite positive active material $(0.01Li_2TiO_3 \cdot 0.99Li_{1.03}Ni_{0.91} Co_{0.06}Mn_{0.03}O_2)$ $(0.01Li_2TiO_3 \cdot 0.99[0.015Li_2MnO_3 \cdot 0.985Li_{1.02}Ni_{0.91}Co_{0.06}Mn_{0.015}O_2])$ was prepared in the same manner as in Example 1, except that the amounts of nickel sulfate, cobalt sulfate, manganese sulfate, and lithium hydroxide used as starting materials were changed so as to obtain the composite positive active material $(0.01Li_2TiO_3 \cdot 0.99Li_{1.03}Ni_{0.91}Co_{0.06}Mn_{0.03}O_2)(0.01Li_2TiO_3 \cdot 0.99[0.015Li_2MnO_3 \cdot 0.985Li_{1.02}Ni_{0.91}Co_{0.06}Mn_{0.015}O_2])$.

Example 7: Preparation of Composite Positive Active Material $(0.01Li_2TiO_3 \cdot 0.99Li_{1.05}Ni_{0.91}Co_{0.06}Mn_{0.03}O_2)$ $(0.01Li_2TiO_3 \cdot 0.99[0.015Li_2MnO_3 \cdot 0.985Li_{1.04}Ni_{0.91}Co_{0.06}Mn_{0.015}O_2])$ A composite positive active material $(0.01Li_2TiO_3 \cdot 0.99Li_{1.05}Ni_{0.91}Co_{0.06}Mn_{0.03}O_2)$ $(0.01Li_2TiO_3 \cdot 0.99[0.015Li_2MnO_3 \cdot 0.985Li_{1.04}Ni_{0.91}Co_{0.06}Mn_{0.015}O_2])$ was prepared in the same manner as in Example 1, except that the amounts of nickel sulfate, cobalt sulfate, manganese sulfate, and lithium hydroxide used as starting materials were changed so as to obtain the composite positive active material $(0.01Li_2TiO_3 \cdot 0.99Li_{1.05}Ni_{0.91}Co_{0.06}Mn_{0.03}O_2)(0.01Li_2TiO_3 \cdot 0.99[0.015Li_2MnO_3 \cdot 0.985Li_{1.04}Ni_{0.91}Co_{0.06}Mn_{0.015}O_2])$.

Example 8: Preparation of Composite Positive Active Material $(0.05Li_2TiO_3 \cdot 0.95Li_{1.05}Ni_{0.91}Co_{0.06}Mn_{0.03}O_2)$ $(0.05Li_2TiO_3 \cdot 0.95[0.015Li_2MnO_3 \cdot 0.985Li_{1.04}Ni_{0.91}Co_{0.06}Mn_{0.015}O_2])$ A composite positive active material $(0.05Li_2TiO_3 \cdot 0.95Li_{1.05}Ni_{0.91}Co_{0.06}Mn_{0.03}O_2)$ $(0.05Li_2TiO_3 \cdot 0.95[0.015Li_2MnO_3 \cdot 0.985Li_{1.04}Ni_{0.91}Co_{0.06}Mn_{0.015}O_2])$ was prepared in the same manner as in Example 1, except that the amounts of nickel sulfate, cobalt sulfate, manganese sulfate, and lithium hydroxide used as starting materials were changed so as to obtain the composite positive active material $(0.05Li_2TiO_3 \cdot 0.95Li_{1.05}Ni_{0.91}Co_{0.06}Mn_{0.03}O_2)$ $(0.05Li_2TiO_3 \cdot 0.95[0.015Li_2MnO_3 \cdot 0.985Li_{1.04}Ni_{0.91}Co_{0.06}Mn_{0.015}O_2])$.

Comparative Example 1: Preparation of Composite Positive Active Material $(LiNi_{0.91}Co_{0.06}Mn_{0.03}O_2)$ A composite positive active material was synthesized by a co-precipitation method as follows.

As starting materials, a nickel sulfate, a cobalt sulfate and a manganese sulfate were stoichiometrically mixed so as to obtain a composite positive active material $(LiNi_{0.91}Co_{0.06}Mn_{0.03}O_2)$.

The nickel sulfate, a cobalt sulfate and the manganese sulfate were dissolved in distilled water at a concentration of 2 M to obtain a precursor mixture. Ammonium hydroxide ($NH_4OH$) as a chelating agent and sodium hydroxide as a precipitating agent were added to the precursor mixture, and a co-precipitation reaction proceeded at 65° C. for 4 hours to obtain a precipitate ($Ni_{0.91}Co_{0.06}Mn_{0.03}(OH)_2$).

The resulting precipitate was washed with distilled water, dried at 80° C. for 24 hours, and mixed with ethanol and lithium hydroxide ($Li(OH).H_2O$). The lithium hydroxide was stoichiometrically mixed so as to obtain the composite positive active material ($LiNi_{0.91}Co_{0.06}Mn_{0.03}O_2$).

The resulting mixture was heat-treated in air at about 750° C. for about 12 hours to thereby obtain the target composite positive active material ($LiNi_{0.91}Co_{0.06}Mn_{0.03}O_2$).

Comparative Example 2

A composite positive active material ($Li_{1.03}Ni_{0.91}Co_{0.06}Mn_{0.03}O_2$) was prepared in the same manner as in Comparative Example 1, except that the amounts of nickel sulfate, cobalt sulfate, manganese sulfate, and lithium hydroxide used as starting materials were changed so as to obtain the composite positive active material ($Li_{1.03}Ni_{0.91}Co_{0.06}Mn_{0.03}O_2$).

Comparative Example 3

A composite positive active material ($Li_{1.05}Ni_{0.91}Co_{0.06}Mn_{0.03}O_2$) was prepared in the same manner as in Comparative Example 1, except that the amounts of nickel sulfate, cobalt sulfate, manganese sulfate, and lithium hydroxide used as starting materials were changed so as to obtain the composite positive active material ($Li_{1.05}Ni_{0.91}Co_{0.06}Mn_{0.03}O_2$).

Comparative Example 4: Preparation of Composite Positive Active Material ($Li_{1.05}[(Ni_{0.91}Co_{0.06}Mn_{0.03})_{0.95}Ti_{0.05}]O_2$)

A nickel sulfate, a cobalt sulfate, a manganese sulfate, and a titanium oxide ($TiO_2$) as a titanium precursor were dispersed in distilled water at a concentration of 2 M to obtain a precursor mixture. A sodium hydroxide as a precipitating agent was added to the precursor mixture, and a co-precipitation reaction was allowed at 65° C. for 4 hours to obtain a precipitate ($Ni_{0.91}Co_{0.06}Mn_{0.03})_{0.95}.Ti_{0.05}(OH)_2$.

The resulting precipitate was washed with distilled water, dried at 80° C. for 24 hours, and mixed with ethanol and lithium hydroxide ($Li(OH).H_2O$). The lithium hydroxide was stoichiometrically mixed so as to obtain the composite positive active material ($Li_{1.05}[(Ni_{0.91}Co_{0.06}Mn_{0.03})_{0.95}Ti_{0.05}]O_2$).

The resulting mixture was heat-treated in air at about 750° C. for about 12 hours to thereby obtain the target composite positive active material ($Li_{1.05}[(Ni_{0.91}Co_{0.06}Mn_{0.03})_{0.95}Ti_{0.05}]O_2$).

Example 9: Manufacture of a Lithium Battery

The composite positive active material prepared in Example 1, a carbon conducting material (Denka Black), and polyvinylidene fluoride (PVDF) as a binder were homogenously mixed in a weight ratio of about 90:5:5 in N-methyl-2-pyrrolidone (NMP) as a solvent, to prepare a slurry.

The slurry was coated on an aluminum substrate (thickness: 15 μm using a doctor blade, dried under reduced pressure at 120° C., and then pressed using a roll-press into a sheet to manufacture a lithium battery.

In manufacturing lithium battery, lithium metal was used as a counter electrode, and a liquid electrolyte obtained by dissolving 1.3 M $LiPF_6$ in a mixed solvent of ethylene carbonate (EC), ethylmethyl carbonate (EMC), and diethyl carbonate (DEC) in a volume ratio of about 3:5:2 was used.

Examples 10-16: Manufacture of Lithium Battery

Lithium batteries were manufactured in the same manner as in Example 9, except that the composite positive active materials prepared in Examples 2 to 8 were used, respectively, instead of the composite positive active material prepared in Example 1.

Examples 17: Preparation of Composite Positive Active Material

A composite positive active material ($0.05Li_2TiO_3$-$0.95Li_{1.05}$ $Ni_{0.90}Co_{0.06}Mn_{0.03}Al_{0.01}O_2$)($0.05Li_2TiO_3.0.95$ [$0.015Li_2MnO_3$-$0.985Li_{1.04}Ni_{0.90}Co_{0.06}Mn_{0.03}Al_{0.01}O_2$]) was prepared in the same manner as in Example 1, except that aluminum nitrate was further added to the precursor mixture, and the amounts of nickel sulfate, cobalt sulfate, manganese sulfate, aluminum nitrate, and lithium hydroxide used as starting materials were changed so as to obtain the composite positive active material.

Examples 18: Preparation of Composite Positive Active Material

A composite positive active material having a lithium fluoride (LiF) coating layer formed on a surface of the composite positive active material prepared in Example 1 was obtained as follows.

0.26 grams (g) of lithium nitrate and 50 milliliters (ml) of water were added to and mixed with 20 g of the composite positive active material prepared in Example 1, an ammonium fluoride was added to the mixture, and the mixture was stirred at a temperature of 80° C. to perform co-precipitation. A precipitate obtained by performing the co-precipitation was dried at a temperature of about 120° C. for 12 hours, and the dried resultant was heat-treated at a temperature of about 400° C. for 5 hours to obtain the composite positive active material having a coating layer including a lithium fluoride.

Comparative Examples 5-8: Manufacture of Lithium Battery

Lithium batteries were manufactured in the same manner as in Example 9, except that the composite positive active materials prepared in Comparative Examples 1 to 4 were used, respectively, instead of the composite positive active material prepared in Example 1.

Evaluation Example 1: X-Ray Diffraction Analysis

1) Examples 1 to 3 and Comparative Examples 1 and 2

The composite positive active materials prepared in Examples 1 to 3 and the positive active materials prepared in Comparative Examples 1 and 2 were analyzed by X-ray diffraction (XRD) using a Rigaku RINT2200HF+ diffractometer with CuKα radiation (1.540598 Angstroms (Å)).

Figure 2A:
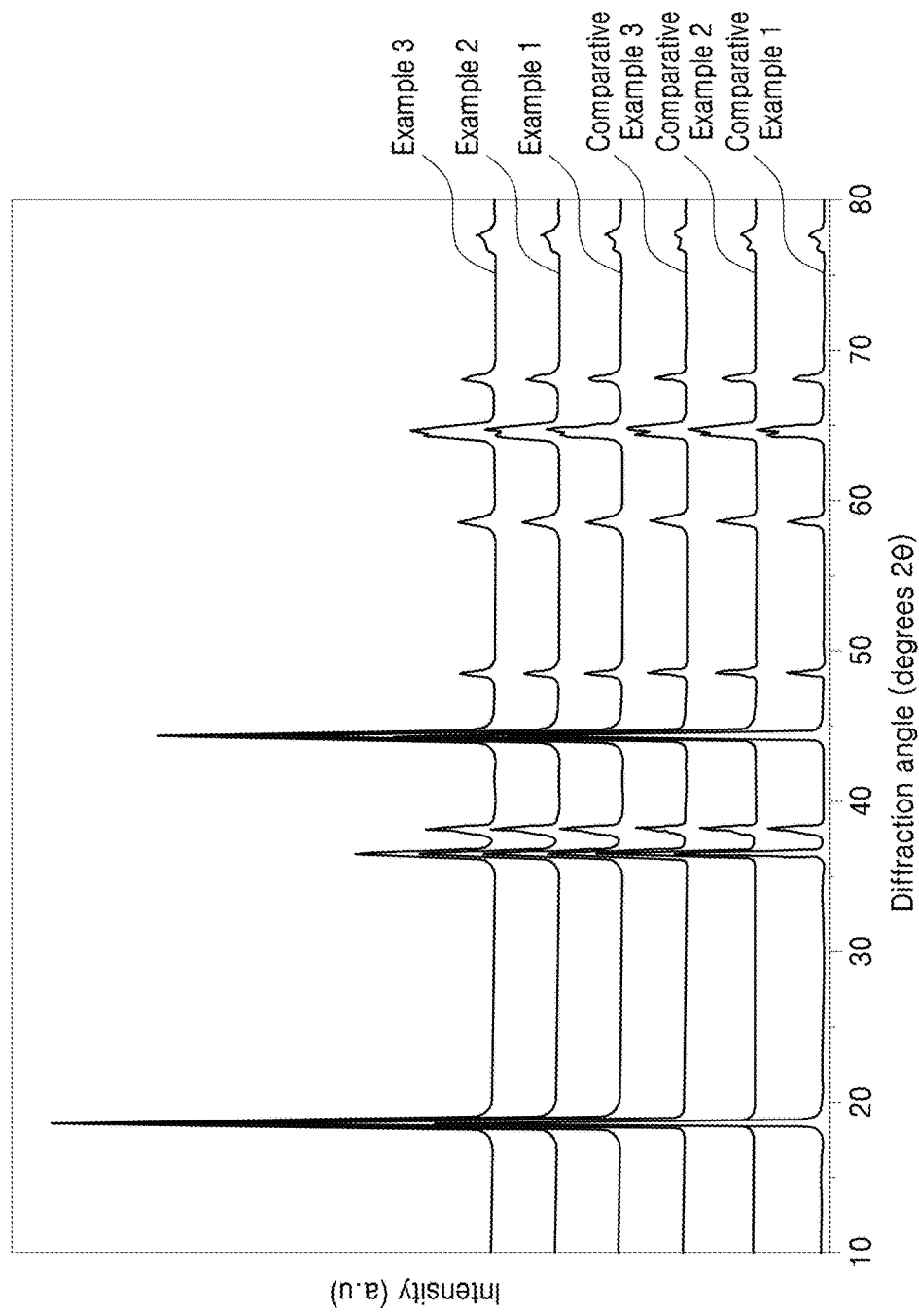
FIGS. 2A and 2B are each a graph of intensity (arbitrary units, a.u.) versus diffraction angle (degrees 2-theta, 2θ) illustrating the results of X-ray diffraction analysis using CuKα of the exemplary composite positive active materials prepared in Examples 1 to 7 and the positive active materials prepared in Comparative Examples 1, 2, and 3.
Figure 2B:
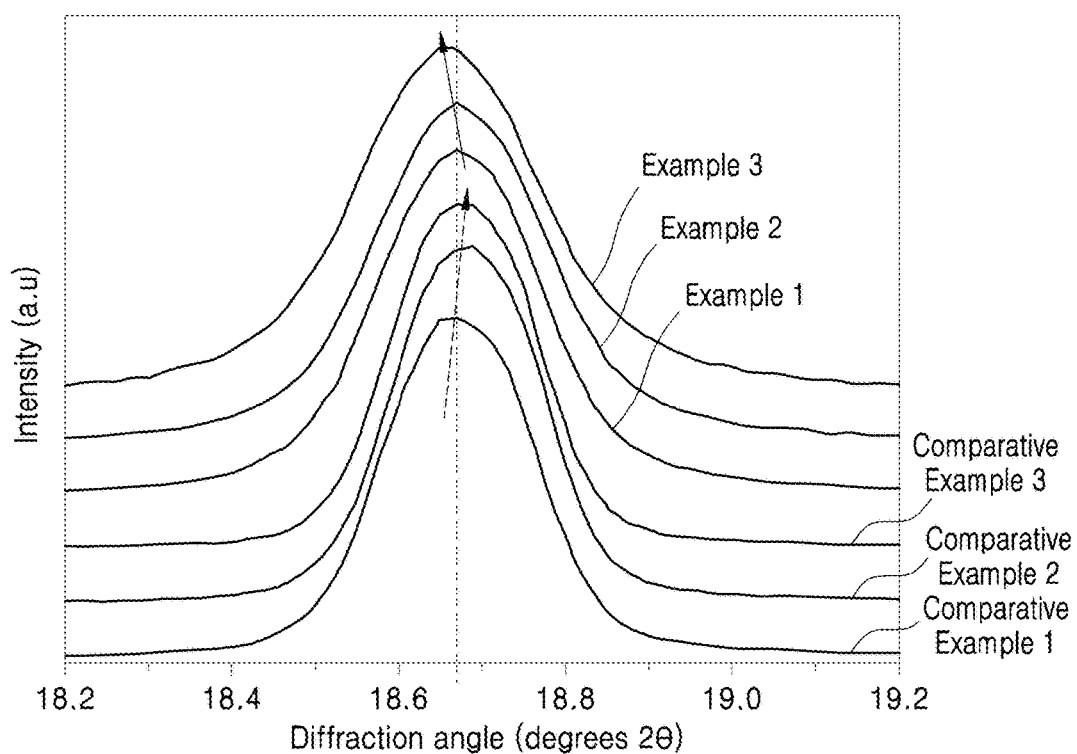

The XRD results are shown in FIGS. 2A and 2B. FIG. 2B is an enlarged view of a region of FIG. 2A having a diffraction angle 2θ of 18.2° to 19.2°.

Referring to FIGS. 2A and 2B, as amounts of lithium in the composite positive active materials ($Li_{1+x}NiCoMnO_2$, x=0, 0.03, 0.05) of the Comparative Examples 1 through 3 is increased, a diffraction angle 2θ value of a peak corresponding to the (003) face was also increased, indicating that a lattice size of the composite positive active materials becomes smaller. Also, with increasing amounts of $Li_2TiO_3$ from 1 mol % to 3 mol % in the $Li_2TiO_3$-embedded layered materials (the composite positive active materials of Examples 1 through 3), peak shifting occurred towards a smaller diffraction angle 2θ value, indicating an increased lattice size of the composite positive active materials. In the composite positive active materials ($Li_{1+x}NiCoMnO_2$), a full width at half maximum (FWHM) value was reduced with an increasing amount of lithium, but a full width at half maximum (FWHM) value was increased with an increasing imbedded amount of $Li_2TiO_3$.

2) Examples 1, and Examples 4 to 7

The composite positive active materials prepared in Example 1 and the positive active materials prepared in Examples 4 to 7 were analyzed by XRD analysis using a Rigaku RINT2200HF+ diffractometer with CuKα radiation (1.540598 Å).

Figure 3A:
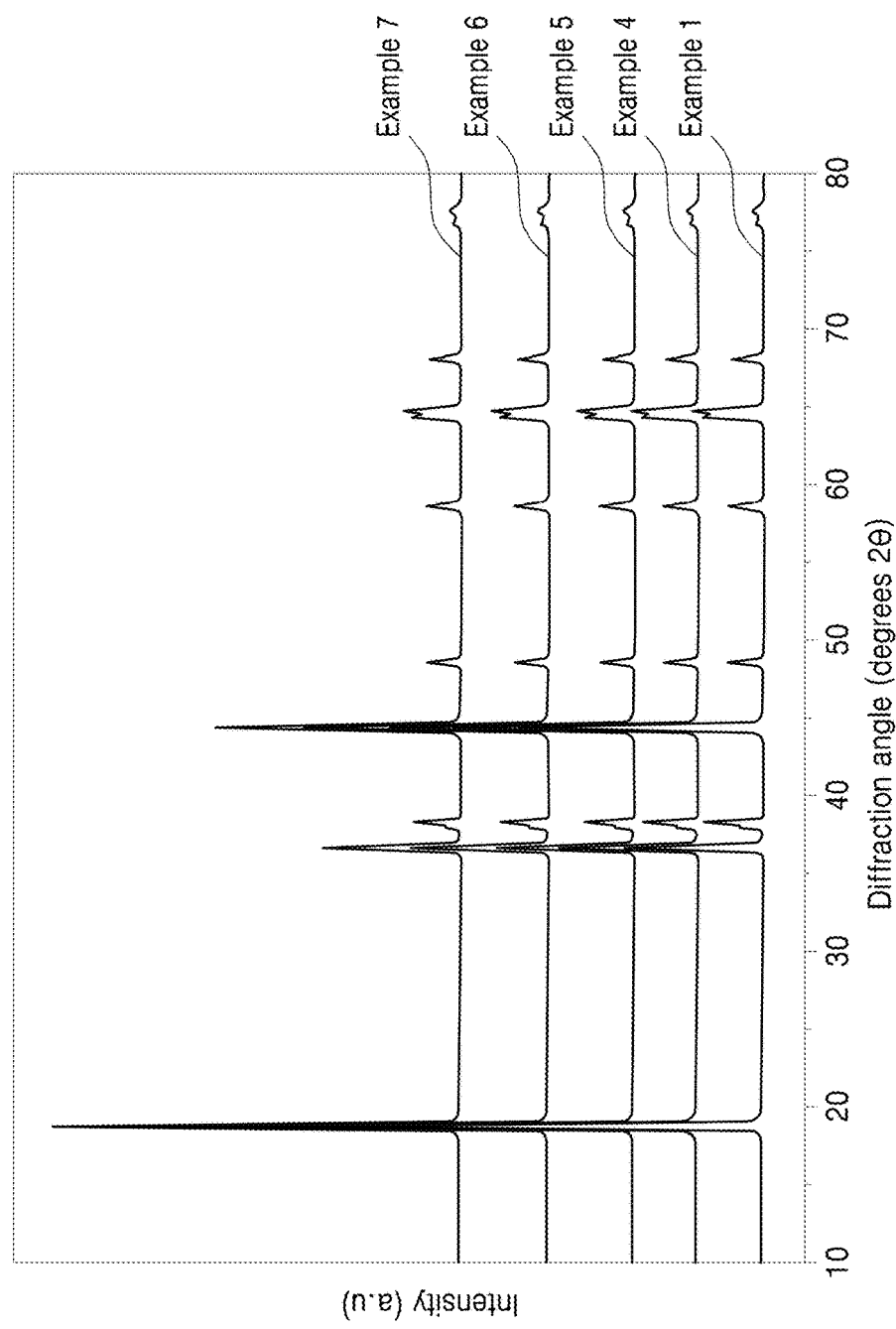
FIGS. 3A to 3B are each a graph of intensity (a.u.) versus diffraction angle (degrees 2θ) illustrating the results of X-ray diffraction analysis using CuKα of the exemplary composite positive active materials prepared in Example 1 and Examples 4 to 7.
Figure 3B:
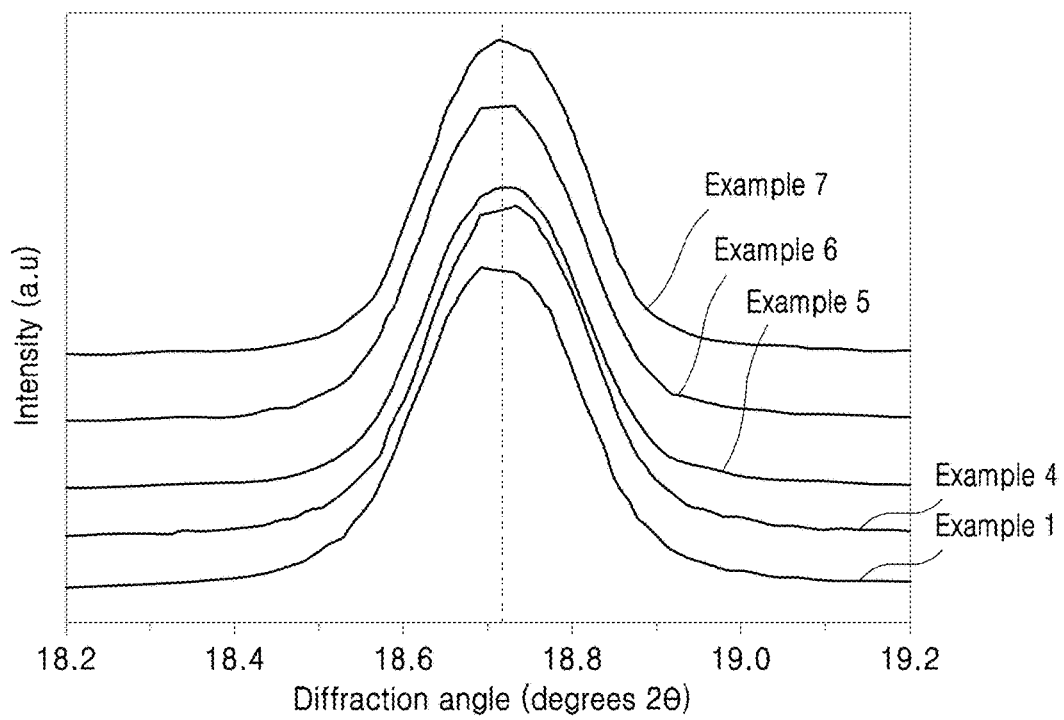
Figure 3C:
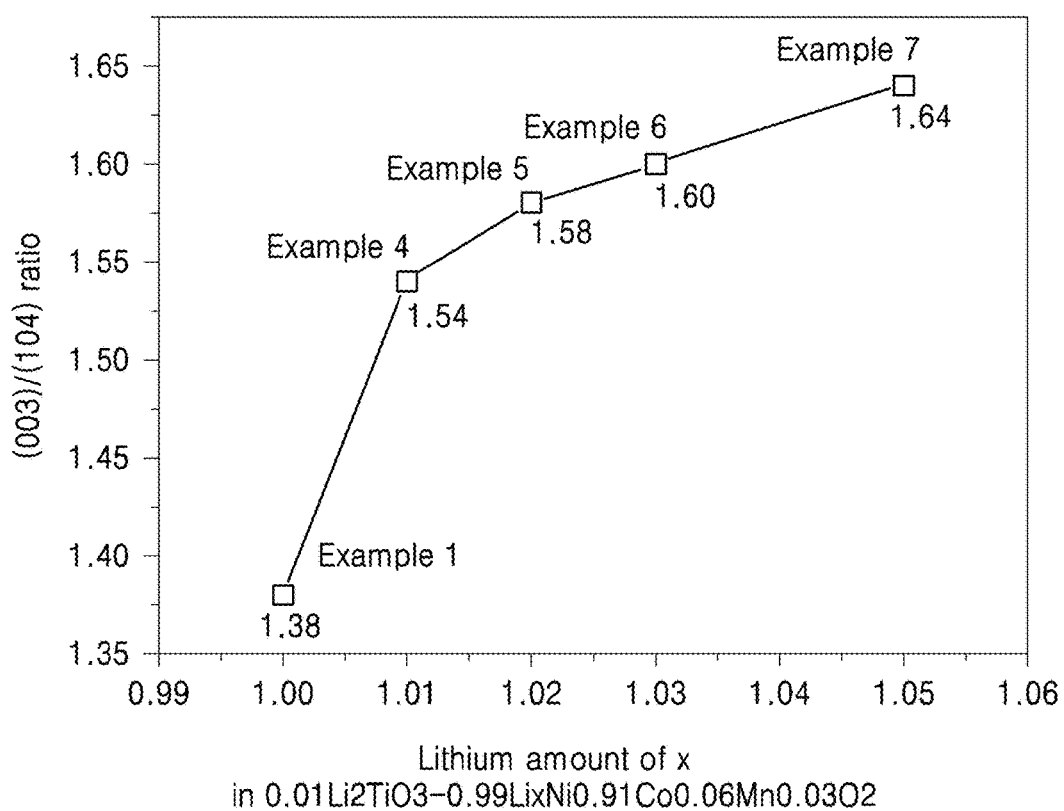
FIG. 3C is a graph of the intensity ratio of an intensity of a peak corresponding to a (003) face to an intensity of a peak corresponding to a (104) face versus the value of x in the composite $0.01Li_2TiO_3 \cdot 0.99Li_xNi_{0.91}Co_{0.06}Mn_{0.03}O_2$.

The XRD results are shown in FIGS. 3A to 3C. FIG. 3B is an enlarged view of a region of FIG. 3A having a diffraction angle of 18.2° to 19.2° 2θ. FIG. 3C illustrates a peak intensity ratio of the peak corresponding to the (003) face to the peak corresponding to the (104) face with respect to the amount of lithium in the composite positive active material, wherein a peak corresponding to the (104) face was at a diffraction angle of about 44.5° 2θ, and a peak corresponding to the (003) face was at a diffraction angle of about 18.7° 2θ.

Referring to FIGS. 3A and 3B, there was no shifting of peaks corresponding to the (003) face in the composite positive active materials in Examples 1, and 4 to 7. Without being limited by theory, it is believed that this is attributed to a shifting tendency towards a larger diffraction angle 2θ value with an increasing value of x in $Li_{1+x}NiCoMnO_2$ may balance a shifting tendency towards a smaller diffraction angle 2θ value with an increasing amount of $Li_2TiO_3$. Referring to FIG. 3C, a peak intensity ratio of peak corresponding to the (003) face to the peak corresponding to the (104) face increases with increasing amounts of lithium in the composite positive active material. These results indicate that excess lithium-contained composite positive active material ($Li_{1+x}NiCoMnO_2$) may have a good integrated layered structure.

Evaluation Example 2: Scanning Electron Microscopy (SEM)

1) Examples 1 to 3

The composite positive active materials of Examples 1 to 3 were analyzed by scanning electron microscopy (SEM). The SEM results are shown in FIGS. 4A to 4F.

Figure 4A:
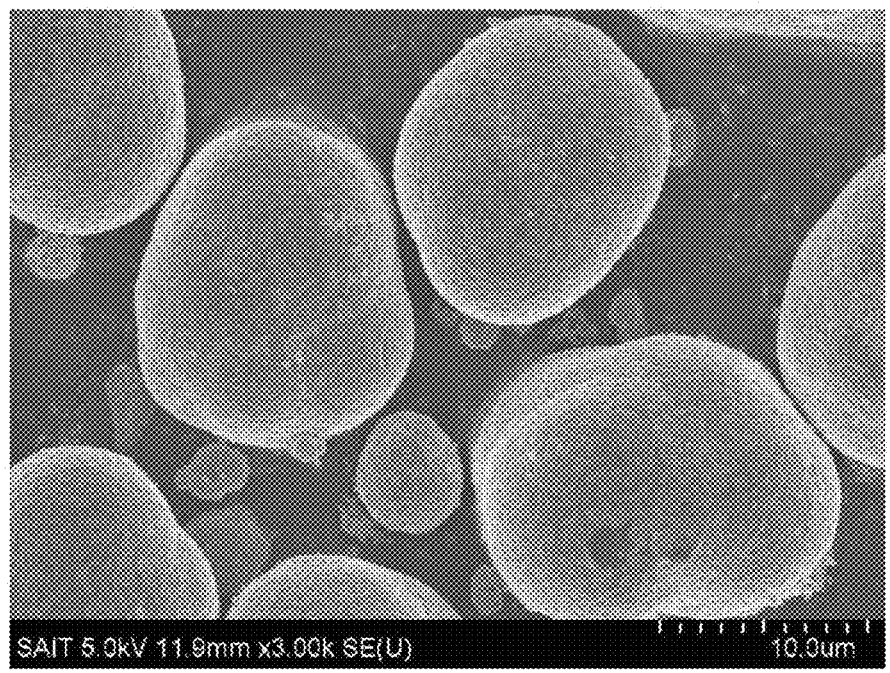
FIGS. 4A, 4B, 4C, 4D, 4E, and 4F are scanning electron microscope (SEM) images of the composite positive active materials prepared in Examples 1 to 3.
Figure 4B:
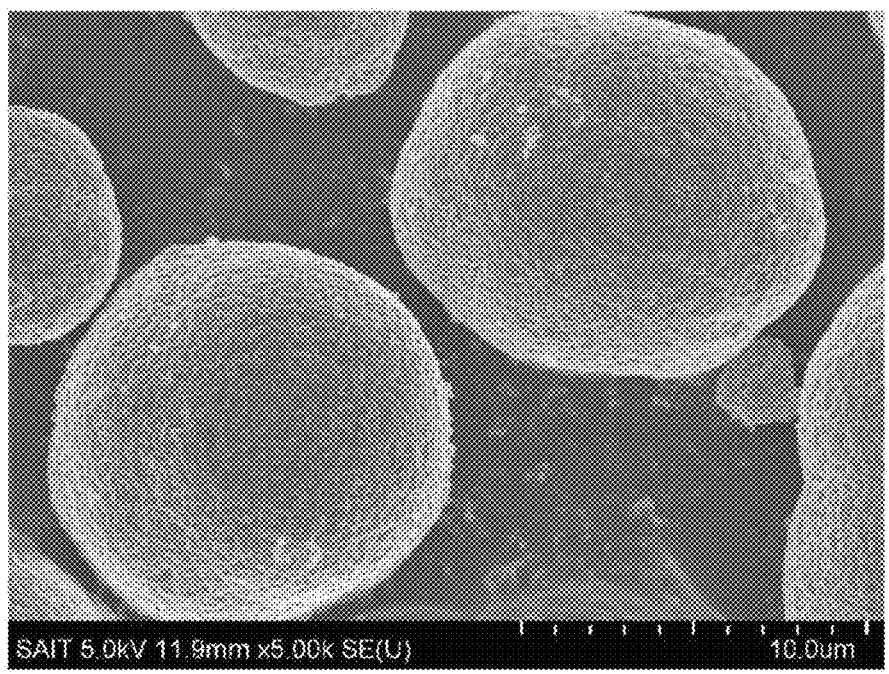
Figure 4C:
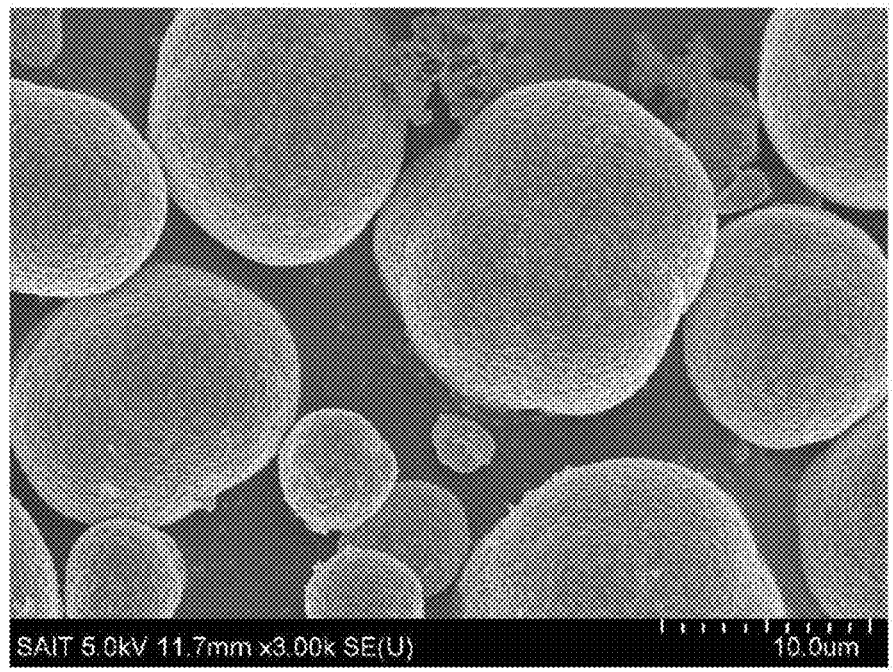
Figure 4D:
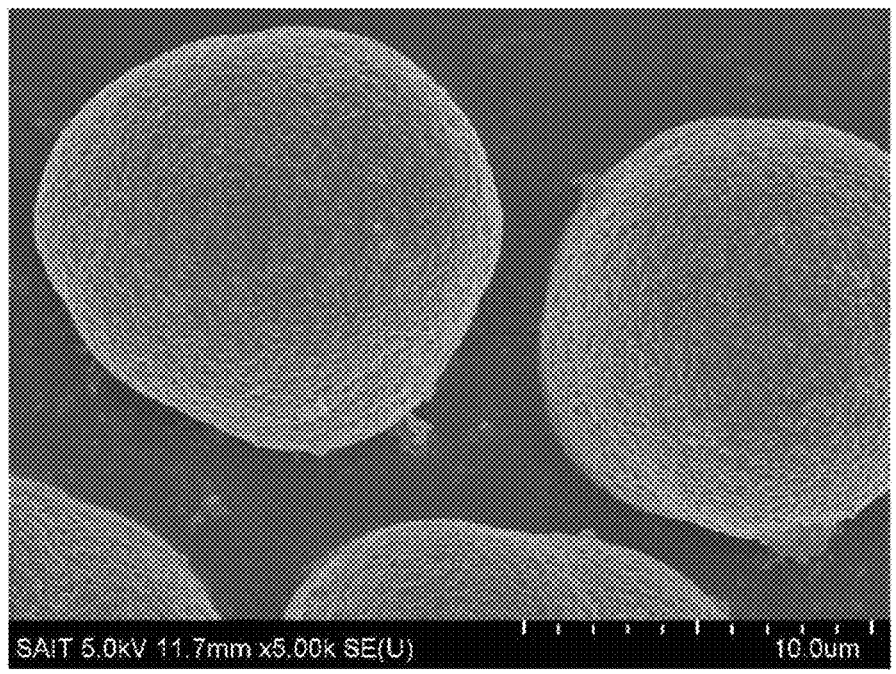
Figure 4E:
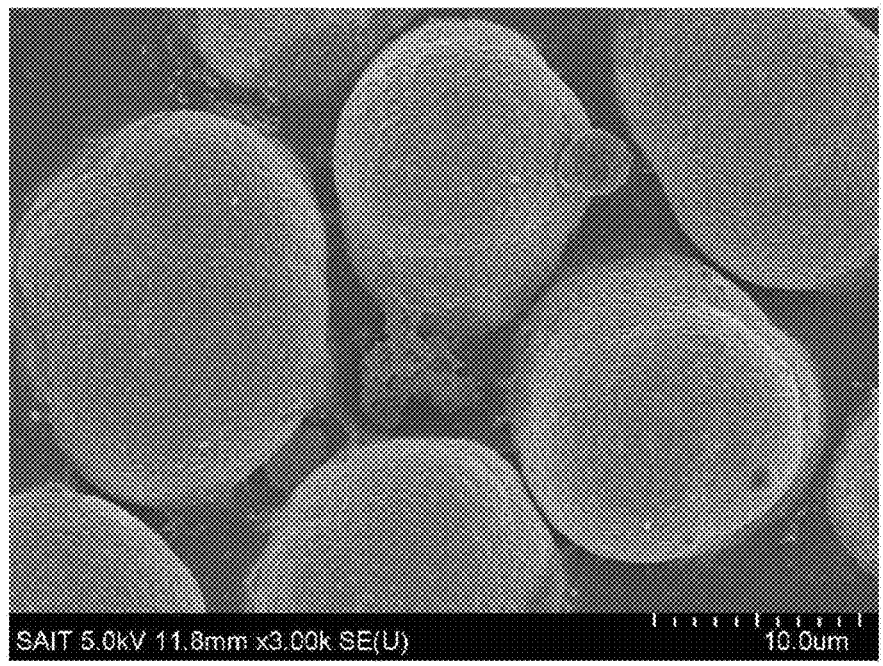
Figure 4F:
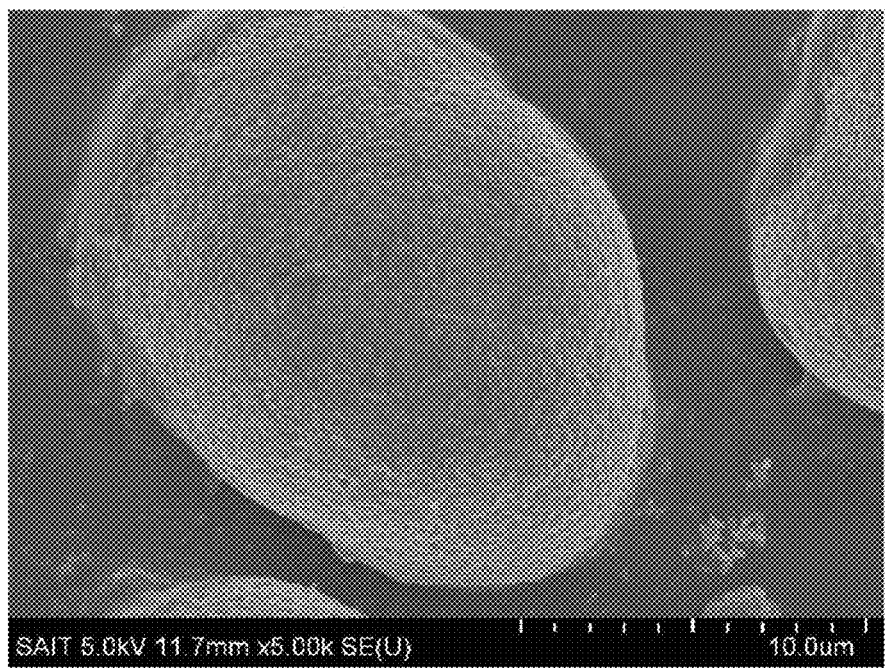

FIGS. 4A and 4B are SEM images of the composite positive active material of Example 1. FIGS. 4C and 4D are SEM images of the composite positive active material of Example 2. FIGS. 4E and 4F are SEM images of the composite positive active material of Example 3.

Referring to FIGS. 4A to 4F, with increasing amounts of $Li_2TiO_3$, the size of the primary particles of the composite positive active materials was reduced by up to about 200 nm, although the sizes of the second particles is not significantly changed, leading to facilitated migration of lithium ions and suppressed side reactions with the electrolyte due to such reduced primary particle sizes.

Evaluation Example 3: Solid-State Nuclear Magnetic Resonance (NMR)

The composite positive active material of Example 8, the composite positive active material of Comparative Example 1, and $Li_2TiO_3$ were analyzed by lithium solid-state nuclear magnetic resonance (NMR) using a Bruker AVANCE III. The solid-state NMR results are shown in FIG. 5.

Figure 5:
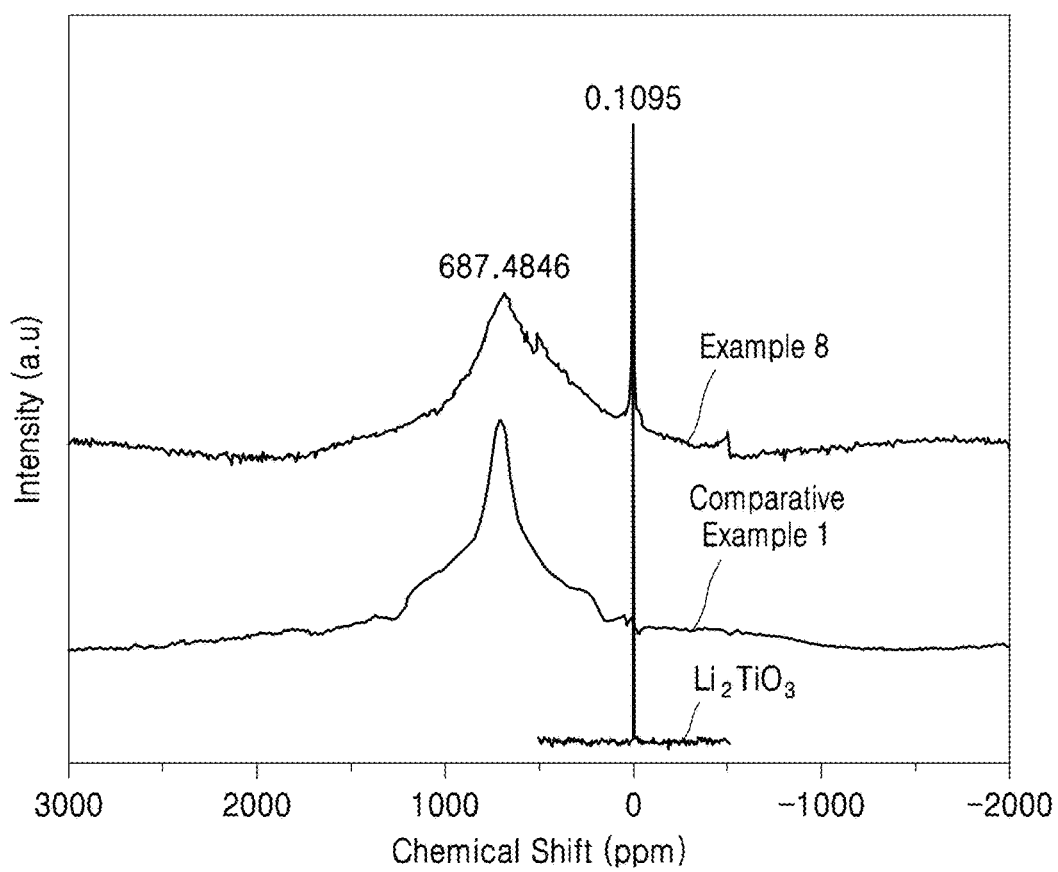
FIG. 5 is a graph of intensity (a.u.) versus chemical shift (parts per million, ppm), which illustrates the results of lithium solid-state nuclear magnetic resonance (NMR) analysis on the composite positive active materials of Example 8, Comparative Example 1, and $Li_2TiO_3$.

Referring to FIG. 5, unlike the composite positive active material of Comparative Example 1, the composite positive active material of Example 8 exhibited a peak corresponding to $Li_2TiO_3$ at a chemical shift of about 0 ppm, and a maximum intensity peak corresponding to lithium nickel cobalt manganese oxide at a chemical shift of about 687.4846 ppm. As shown in the solid-state NMR results of the composite positive active material of Example 8, due to the formation of a $Li_2TiO_3$ phase and a subsequent reduced hyperfine interaction, sharp peaks appeared.

These results support that the composite positive active material of Comparative Example 1 was a solid solution, while the composite positive active material of Example 8 was a complex including the $Li_2TiO_3$ phase.

Evaluation Example 4: Extended X-Ray Absorption Fine Structure (EXAFS)

The composite positive active materials prepared in Examples 8 and Comparative Example 4 were analyzed by extended X-ray absorption fine structure (EXAFS) analysis. The EXAFS results of the composite positive active materials of Example 8 and Comparative Example 4 are shown in FIGS. 6A and 6B, respectively.

Figure 6A:
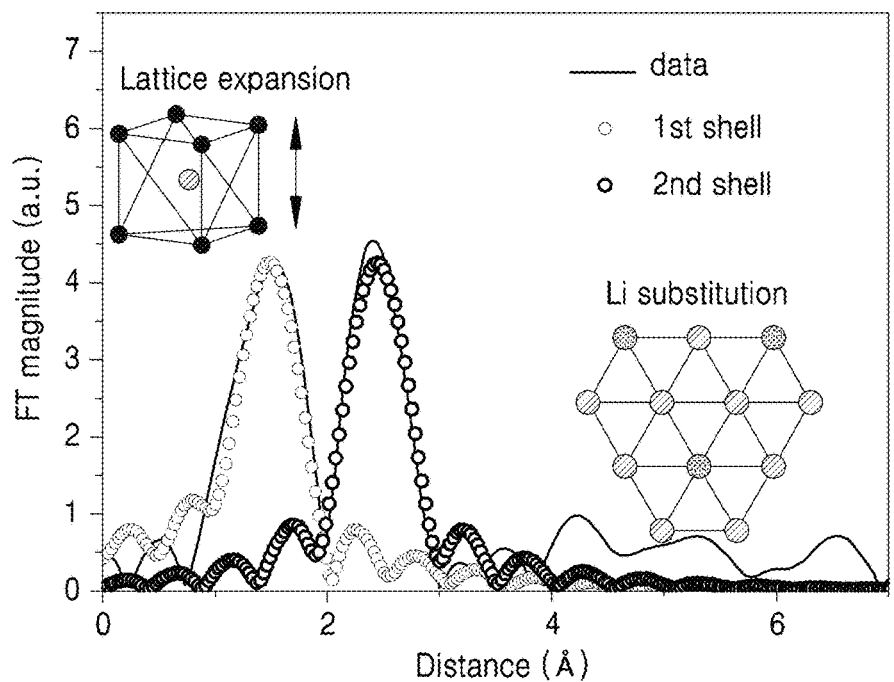
FIGS. 6A and 6B are graphs of Fourier transform (FT) magnitude (a.u.) versus distance (Angstroms, Å), which illustrate the results of extended X-ray absorption fine structure (EXAFS) analysis on the composite positive active materials of Example 8 and Comparative Example 4, respectively.
Figure 6B:
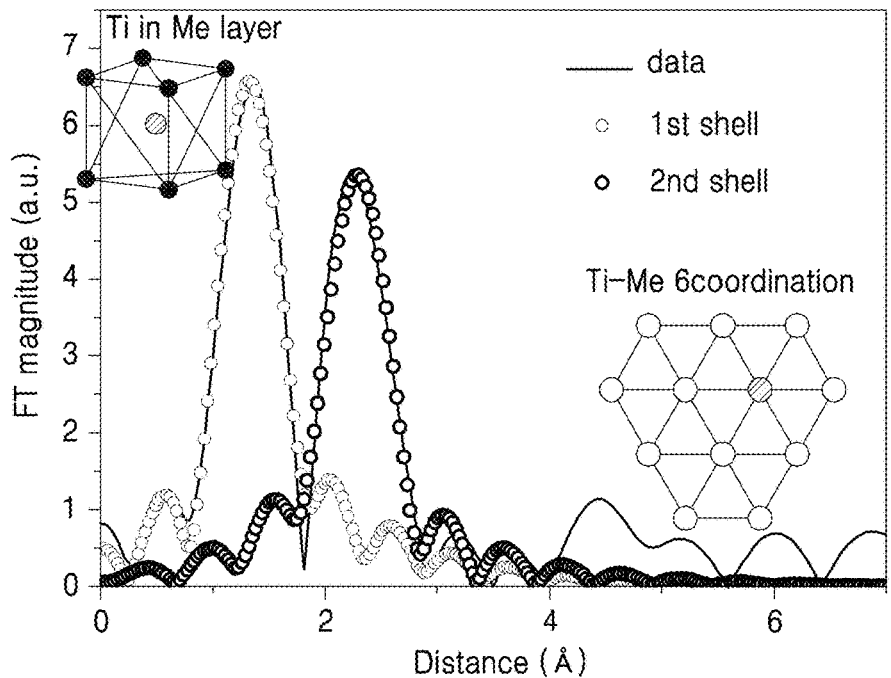

Referring to FIG. 6A, a first peak appearing at a distance of about 1 Å to 2 Å is associated with a transition metal and oxygen, and a second peak appearing at a distance of about 2 Å to about 3 Å is associated with another metal that is not the transition metal. That is, the first peak is related to the oxygen around Ti, and the second peak is related to the coordination of a metal around Ti, i.e., information about lithium (Li) and Ti. However, Li has a small scattering factor for X-rays, and so no signal from Li was detected, so that the second peak had a smaller intensity than that of the first peak, indicating the presence of $Li_2TiO_3$. Due to the formation of $Li_2TiO_3$ by controlling a ratio of lithium to transition metal, the binding length of Ti—O in the first shell was increased, and the coordination number between Ti and transition metal (Me) in the second shell was reduced. The transition metal refers to nickel, cobalt, and manganese.

Evaluation Example 5: Charging and Discharging Characteristics

1) Examples 9 to 11 and Comparative Example 5-7

Charging and discharging characteristics of the lithium batteries prepared in Examples 9 to 11 and Comparative Examples 5 to 7 are measured under the below described method and the conditions shown in Table 1.

The lithium batteries prepared in Examples 9 to 11 and Comparative Examples 5 to 7 were subjected to charge and discharge cycles at about 25° C.

$$\text{Capacity retention rate (\%)} = [\text{Discharge capacity at } 50^{th} \text{ cycle/Discharge capacity at } 1^{st} \text{ cycle}] \times 100\% \qquad \text{Equation 2}$$

$$\text{Capacity recovery (\%)} = [\text{Discharge capacity at } 51^{st} \text{ cycle/Discharge capacity at } 2^{nd} \text{ cycle}] \times 100\% \qquad \text{Equation 3}$$

TABLE 1

| Characteristics | | Example 9 | Example 10 | Example 11 | Comparative Example 5 | Comparative Example 6 | Comparative Example 7 |
|---|---|---|---|---|---|---|---|
| Initial capacity (0.1 C) | Charging (mAh/g) | 236.75 | 232.55 | 227.40 | 239.96 | 243.67 | 245.17 |
| | Discharging (mAh/g) | 224.52 | 211.07 | 200.23 | 227.63 | 232.53 | 233.24 |
| | Efficiency (%) | 94.84 | 90.76 | 88.05 | 94.86 | 95.43 | 95.15 |
| 2nd capacity (0.2 C) | Charging (mAh/g) | 236.75 | 232.55 | 227.40 | 221.28 | 228.52 | 227.94 |
| 1 C first cycle | Charging (mAh/g) | 202.02 | 187.30 | 174.10 | 199.46 | 206.52 | 204.95 |
| | Discharging (mAh/g) | 201.91 | 287.20 | 174.16 | 199.84 | 206.14 | 205.32 |
| | Efficiency (%) | 99.95 | 99.85 | 100.03 | 100.18 | 99.82 | 100.18 |
| Cycle (40$^{th}$) | Capacity retention rate (%) | 95.76 | 95.44 | 95.14 | 93.68 | 92.38 | 90.75 |
| Cycle (50$^{th}$) | Capacity retention rate (%) | 94.25 | 94.71 | 94.04 | 91.88 | 90.28 | 87.06 |
| Capacity recovery | 51$^{st}$ 0.2 C (Capacity)/2$^{nd}$ 0.2 C (%) | 98.58 | 103.35 | 105.87 | 95.79 | 92.86 | 90.42 |

In the 1$^{st}$ charge and discharge cycle, each of the lithium batteries was charged in a constant current/constant voltage (CC/CV) mode at about 0.1 C to about 4.5 V and then discharged at a constant current of 0.1 C to 2.8 V.

From the 2$^{nd}$ charge and discharge cycle, each of the lithium batteries was charged in a CC/CV mode at about 0.5 C to about 4.5 V and then discharged at about 0.2 C to about 2.8 V. Cycle evaluation was performed after charging at a constant current of 1 C to about 4.5 V and discharging at 1 C to 2.5 V.

This 2$^{nd}$ charge and discharge cycle was repeated 40 times and 50 times.

In the 51$^{st}$ charge and discharge cycle, each of the lithium batteries was charged at a constant current of 0.1 C until a voltage of the battery was 4.5 V and then cut-off at a current level at about a rate of 0.1 C while maintaining a constant voltage of about 4.5V. Thereafter, the lithium batteries were discharged at about 0.2 C until a voltage of the battery was 2.8 V.

Figure 7A:
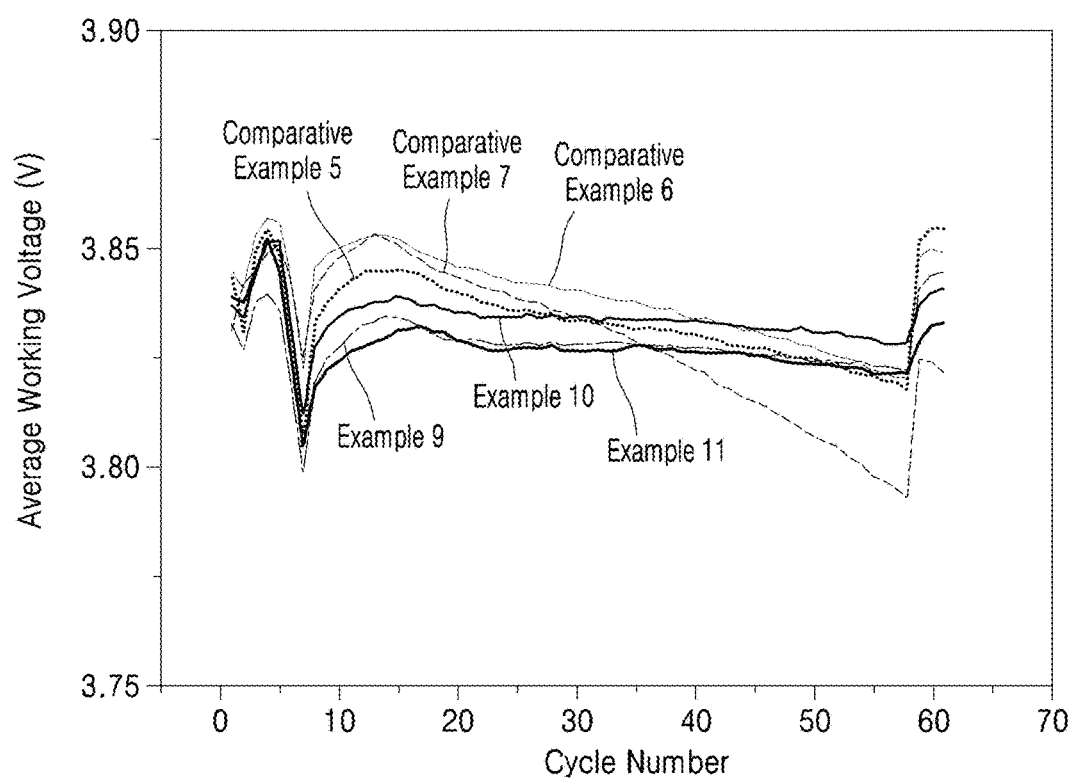
FIG. 7A is a graph of average working voltage (volts, V) versus cycle number, which shows the change in average working voltage with respect to the number of cycles for the lithium batteries prepared in Examples 9 to 11 and Comparative Examples 5 to 7.
Figure 7B:
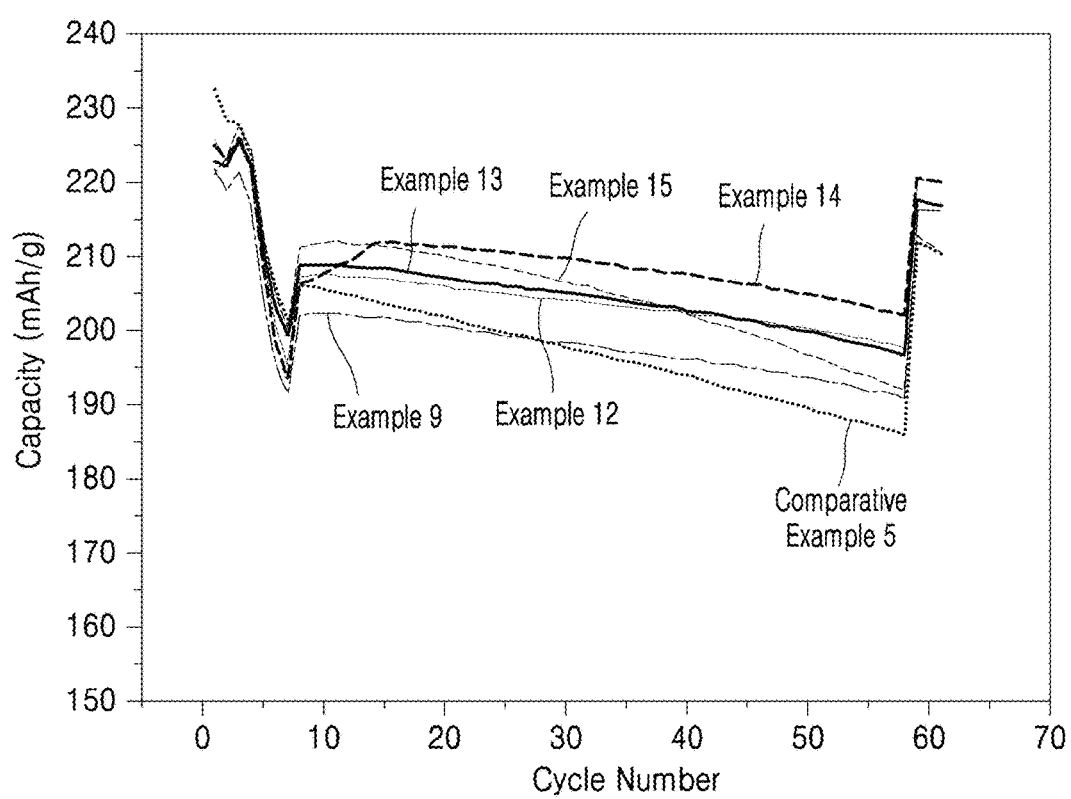
FIG. 7B is a graph of capacity (mAh/g) versus cycle number, which shows the change in capacity with respect to the number of cycles for the lithium batteries prepared in Example 9, Examples 12 to 15, and Comparative Example 5.

Changes in capacity with respect to the number of cycles in the lithium batteries of Examples 9 to 11 and Comparative Examples 5 to 7 are shown in FIG. 7B. Changes in average discharge voltage with respect to the number of cycles in the lithium batteries of Examples 9 to 11 and Comparative Examples 5 to 7 are shown in FIG. 7B.

A discharge voltage decay, a capacity retention rate, and a capacity recovery of each of the lithium batteries were calculated using Equations 1 to 3, respectively, based on the results of FIG. 7A.

$$\text{Discharge voltage decay (Average working voltage retention rate)[mV]} = [\text{Average discharge voltage at } 50^{th} \text{ cycle} - \text{Average discharge voltage at } 1^{st} \text{ cycle}] \qquad \text{Equation 1}$$

The term "average discharge voltage" refers to a discharge voltage corresponding to a median value of a discharge capacity at each cycle.

Referring to Table 1 and FIG. 7A, the lithium batteries of Examples 9 to 11 were found to have improved capacity retention rates and capacity recoveries as compared with those of the lithium batteries of Comparative Examples 5 to 7.

These improved capacity retention rates and capacity recoveries of the lithium batteries of Examples 9 to 11 indicate that the composite positive active materials used to prepare the lithium batteries of Examples 9 to 11 had better structural stability than the composite positive active materials used to manufacture the lithium batteries of Comparative Example 5 to 7.

The lithium batteries of Comparative Examples 5 to 7 were found to have poor capacity retention rates and capacity recoveries, although the initial efficiency characteristics thereof were good.

TABLE 2

| Example | Discharge voltage decay (ΔV) |
|---|---|
| Example 9 | −0.003 |
| Example 10 | −0.0011 |
| Example 11 | −0.0034 |
| Comparative Example 5 | −0.0154 |
| Comparative Example 6 | −0.0251 |
| Comparative Example 7 | −0.0479 |

2) Examples 9, 12 to 15, 19-20 and Comparative Example 5

The lithium batteries prepared in Examples 9, 12 to 15, 19-20, and Comparative Example 5 were subjected to charge and discharge cycles at about 25° C.

In the 1$^{st}$ charge and discharge cycle, each of the lithium batteries was charged in a constant current/constant voltage (CC/CV) mode at about 0.1 C until a voltage of the battery reached 4.5 V and then cut-off at a current level at about a rate of 0.01 C while maintaining a constant voltage of about 4.5V. Thereafter, the lithium batteries were discharged at a constant current of 0.1 C until a voltage of the battery reached 2.8 V.

In the $2^{nd}$ and $3^{rd}$ charge and discharge cycles, each of the lithium batteries was charged at a constant current of 0.5 C until a voltage of the battery was 4.5 V and then cut-off at a current level at about a rate of 0.1 C while maintaining a constant voltage of about 4.5V. Thereafter, the lithium batteries were discharged at about 0.2 C until a voltage of the battery was 2.8 V.

The $3^{rd}$ charge and discharge cycles were repeated 40 times and 50 times.

In the $51^{st}$ charge and discharge cycle, each of the lithium batteries was charged at a constant current of 0.1 C until a voltage of the battery was 4.5 V and then cut-off at a current level at about a rate of 0.1 C while maintaining a constant voltage of about 4.5V. Thereafter, the lithium batteries were discharged at about 0.2 C until a voltage of the battery was 2.8 V.

Figure 7C:
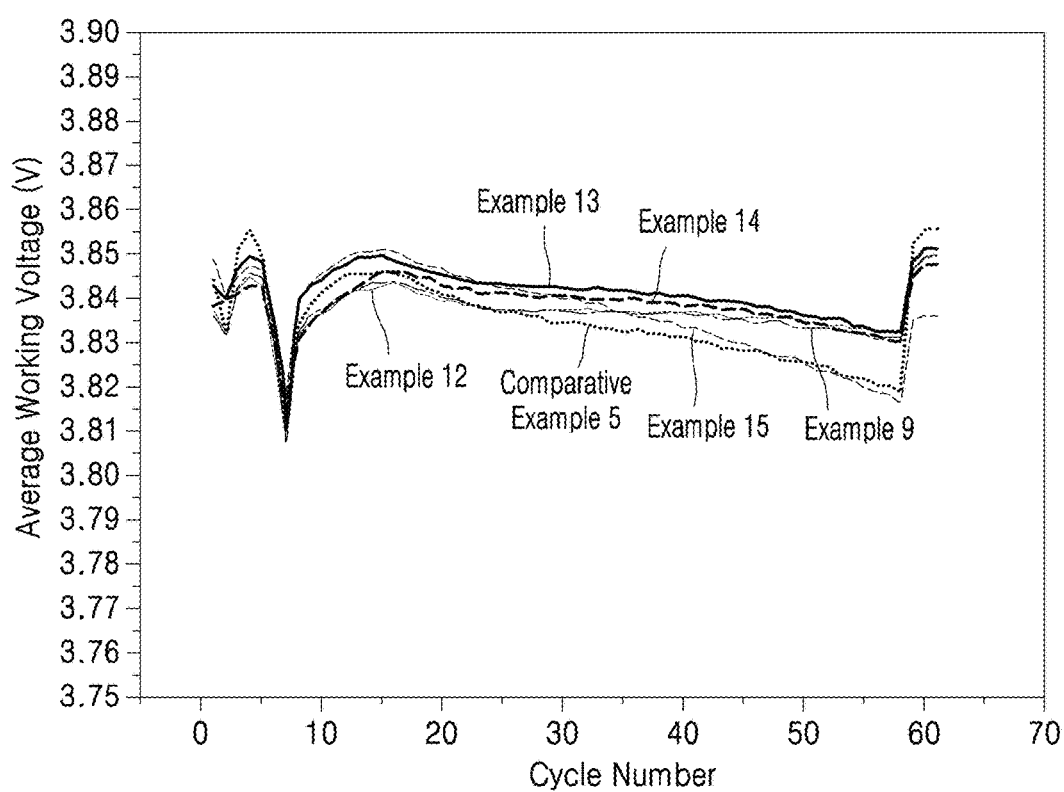
FIG. 7C is a graph of average working voltage (V) versus cycle number, which shows change in average working voltage with respect to the number of cycles for the lithium batteries prepared in Example 9, Examples 12 to 15, and Comparative Example 5.

Changes i" capacity with respect to the number of cycles in the lithium batteries of Examples 9, 12 to 15 and Comparative Example 5 are shown in FIG. 7B. Changes in average discharge voltage with respect to the number of cycles in the lithium batteries of Example 9 and Examples 12 to 15 and Comparative Example 5 are shown in FIG. 7C. Capacity recoveries 1 and 2 of each of the lithium batteries were calculated using Equations 4 and 5, respectively. The results are shown in Table 3.

Capacity recovery 1(%)=[Discharge capacity at $51^{st}$ cycle/Discharge capacity at $2^{nd}$ cycle]×100%   Equation 4

Capacity recovery 2(%)=[Discharge capacity at $3^{rd}$ cycle/Discharge capacity at $1^{st}$ cycle]×100%   Equation 5

TABLE 3

| Characteristics | | Example 12 | Example 13 | Example 14 | Example 15 | Comparative Example 5 |
|---|---|---|---|---|---|---|
| Initial capacity (0.1 C) | Charging (mAh/g) | 239.29 | 240.94 | 241.82 | 242.15 | 243.67 |
| | Discharging (mAh/g) | 225.90 | 222.96 | 225.15 | 221.23 | 232.53 |
| | Efficiency (%) | 94.40 | 92.54 | 93.11 | 91.36 | 95.43 |
| $2^{nd}$ capacity (0.2 C) | Charging (mAh/g) | 223.01 | 222.32 | 223.14 | 223.58 | 228.52 |
| 1 C First cycle | Charging (mAh/g) | 207.77 | 209.31 | 206.70 | 211.81 | 206.52 |
| | Discharging (mAh/g) | 207.58 | 209.06 | 207.08 | 211.77 | 206.14 |
| | Efficiency (%) | 99.91 | 99.88 | 100.19 | 99.98 | 99.82 |
| Cycle($40^{th}$) | Capacity retention rate (%) | 96.65 | 95.95 | 99.32 | 95.98 | 92.38 |
| Cycle($50^{th}$) | Capacity retention rate (%) | 95.22 | 94.14 | 97.63 | 93.51 | 90.28 |
| Capacity recovery 1 | $51^{st}$ 0.2 C (Capacity)/$2^{nd}$ 0.2 C (%) | 98.86 | 97.99 | 98.94 | 95.29 | 92.86 |
| Capacity recovery 2 | 0.2 C, $3^{rd}/1^{st}$ | 99.85 | 99.62 | 99.74 | 99.93 | 99.28 |

Referring to Table 3 and FIGS. 7B and 7C, the lithium batteries of Example 9 and Examples 12 to 15 were found to have improved capacity retention rates and capacity recoveries, as compared with those of the lithium battery of Comparative Example 5.

Also, capacity retention rates and capacity recoveries of the lithium batteries of Examples 19 and 20 were measured. As a result, the lithium batteries of Examples 19 and 20 were found to have improved capacity retention rates and capacity recoveries, as compared with those of the lithium battery of Comparative Example 5.

TABLE 4

| Example | Discharge voltage decay (ΔV) |
|---|---|
| Example 12 | −0.0012 |
| Example 13 | −0.007 |
| Example 14 | −0.0005 |
| Example 15 | −0.00232 |
| Comparative Example 5 | −0.0154 |

Referring to Table 4, the lithium batteries of Examples 12 to 15 were found to have reduced discharge voltage decays, as compared with the lithium battery of Comparative Example 5.

Evaluation Example 6: Rate Capability

1) Examples 9 to 11 and Comparative Examples 5 to 7

Rate capabilities of the lithium batteries of Examples 9 to 11 and Comparative Examples 5 to 7 were evaluated according to the following method and the conditions shown in Table 5.

In the $1^{st}$ charge and discharge cycle each of the lithium batteries was charged in a constant current/constant voltage (CC/CV) mode at about 0.1 C until a voltage of the battery reached 4.5 V and then cut-off at a current level at about a rate of 0.01 C while maintaining a constant voltage of about 4.5V. Thereafter, the lithium batteries were discharged at a constant current of 0.1 C until a voltage of the battery reached 2.8 V.

From the $2^{nd}$ charge and discharge cycle, each of the lithium batteries was charged in a CC/CV mode at about 0.5 C to about 4.5 V and then discharged at about 0.2 C, 0.33 C, 1 C, 2 C, and 3 C to about 2.8 V. Cycle evaluation was performed after charging at 1 C to about 4.5 V and discharging at 1 C to 2.5 V.

Rate capabilities were calculated using Equations 6 and 7. The results are shown in Table 5.

Rate capability (1 C/2 C)={(1 C discharge capacity)/(2 C discharge capacity)}×100%   Equation 6

Rate capability (2 C/0.33 C)={(2 C discharge capacity)/(0.33 C discharge capacity)}×100%   Equation 7

TABLE 5

| Conditions | Example 9 | Example 10 | Example 11 | Comparative Example 5 | Comparative Example 6 | Comparative Example 7 |
|---|---|---|---|---|---|---|
| 0.2 C | 222.94 | 208.09 | 196.59 | 222.56 | 228.52 | 227.32 |
| 0.33 C | 218.45 | 201.09 | 188.90 | 218.07 | 223.56 | 222.84 |
| 1 C | 204.38 | 186.77 | 176.18 | 207.63 | 212.78 | 209.80 |
| 2 C | 194.71 | 179.07 | 166.41 | 199.09 | 205.53 | 200.27 |
| 3 C | 194.57 | 174.74 | 160.78 | 194.57 | 201.50 | 194.96 |
| 1 C/0.2 C | 0.92 | 0.90 | 0.90 | 0.93 | 0.93 | 0.92 |
| 2 C/0.33 C | 0.89 | 0.89 | 0.88 | 0.91 | 0.90 | 0.90 |

Referring to Table 5, the lithium batteries of Examples 9 to 11 were found to have good rate capabilities. The lithium batteries of Comparative Examples 5 to 7 had satisfactory rate capabilities, but poor capacity retention rates and capacity recoveries as described above.

2) Examples 12 to 15 and Comparative Example 5

Rate capabilities of the lithium batteries of Examples 12 to 15 and Comparative Example 5 were evaluated according to the same method as applied to the lithium batteries of Examples 9 to 11 and Comparative Examples 5 to 7 and the conditions shown in Table 6. The results are shown in Table 6.

TABLE 6

| Conditions | Example 12 | Example 13 | Example 14 | Example 15 | Comparative Example 5 |
|---|---|---|---|---|---|
| 0.2 C | 225.69 | 225.86 | 226.17 | 227.72 | 225.69 |
| 0.33 C | 221.82 | 222.57 | 222.57 | 224.65 | 223.56 |
| 1 C | 209.17 | 210.98 | 208.77 | 213.30 | 212.78 |
| 2 C | 201.10 | 203.37 | 198.64 | 205.14 | 205.53 |
| 1 C/0.2 C | 0.93 | 0.93 | 0.92 | 0.94 | 0.93 |
| 2 C/0.33 C | 0.91 | 0.91 | 0.89 | 0.91 | 0.92 |

Referring to Table 6, the lithium batteries of Examples 9 to 11 were found to have good rate capabilities.

Evaluation Example 7: Differential Scanning Calorimetry (DSC)

Thermal stabilities of the composite positive active materials of Example 1 and Comparative Example 1 were evaluated by differential scanning calorimetry (DSC) using a TA Q2000 analyzer (available from TA Instruments). The DSC results of the composite positive active materials are shown in FIG. 8.

Figure 8:
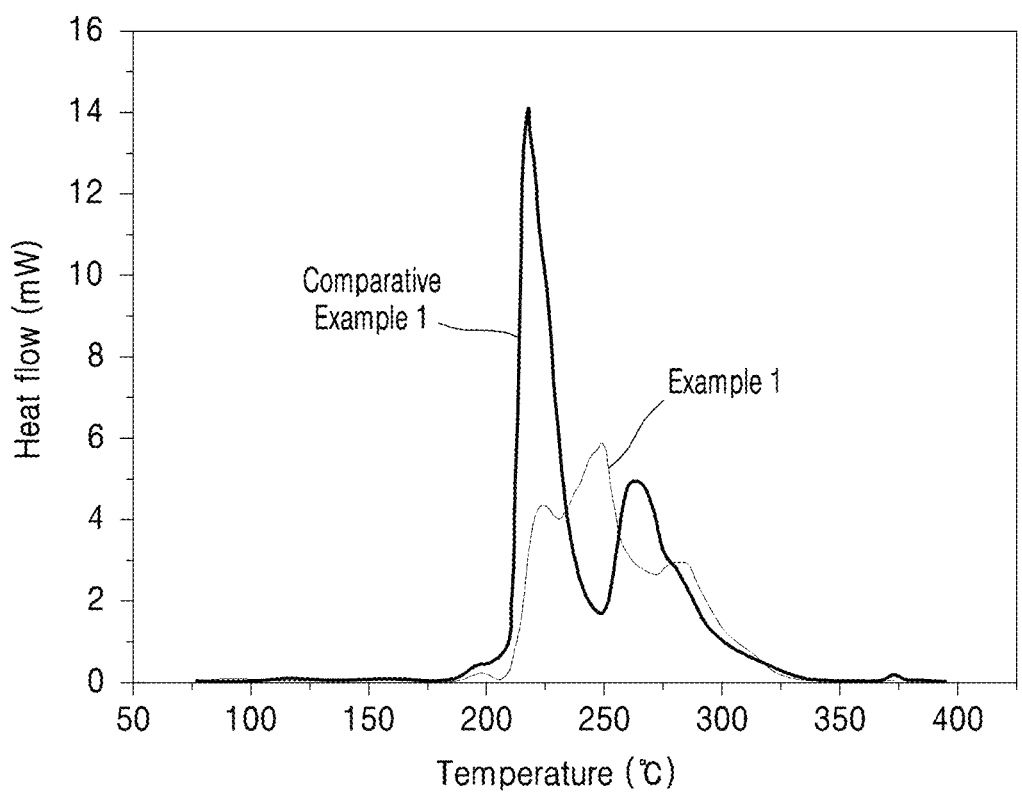
FIG. 8 is a graph of heat flow (milliwatts, mW) versus temperature (degrees Celsius, ° C.), which illustrates the results of differential scanning calorimetry (DSC) on the composite positive active materials of Example 1 and Comparative Example 1.

Referring to FIG. 8, an exothermic reaction was suppressed in the composite positive active material of Example 1 as compared with the composite positive active material of Comparative Example 1, indicating improved thermal stability of the composite positive active material of Example 1 relative to the composite positive active material of Comparative Example 1.

As described above, according to the one or more embodiments, a composite positive active material may have improved structural stability during high-voltage charging. When a positive electrode including the composite positive active material is used, a lithium battery with reduced voltage decay and improved lifespan characteristics even after repeated charging and discharging may be manufactured.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite positive active material comprising a composite represented by Formula 1:

$$\delta Li_2MO_3 \cdot (1-\delta)[xLi_2MnO_3 \cdot (1-x)Li_dNi_aCo_bM'_cO_2] \quad \text{Formula 1}$$

wherein, in Formula 1,

M is Ti or Zr;

M' is Mn, V, Mg, Ga, Si, W, Mo, Fe, Cr, Cu, Zn, Ti, Al, B, or a combination thereof;

$0<\delta<0.5$; $0\leq x<0.3$; $a+b+c\leq 1$; $0<a<1$; $0<b<1$; $0<c<1$; and $0.95\leq d\leq 1.05$.

2. The composite positive active material of claim 1, wherein, in Formula 1, $0<\delta<0.1$, and $0<x<0.1$.

3. The composite positive active material of claim 1, wherein, in Formula 1, $0<\delta<0.05$, and $0<x<0.05$.

4. The composite positive active material of claim 1, wherein, in Formula 1, M' is Mn, Al, or a combination thereof.

5. The composite positive active material of claim 1, wherein the compound represented by Formula 1 is a compound represented by Formula 2, a compound represented by Formula 3, a compound represented by Formula 4, or a compound represented by Formula 5:

$$\delta Li_2TiO_3 \cdot (1-\delta)[xLi_2MnO_3 \cdot (1-x)Li_dNi_aCo_bMn_cO_2] \quad \text{Formula 2}$$

wherein, in Formula 2, $0<\delta<0.1$, $0\leq x<0.1$, $a+b+c\leq 1$, $0<a<1$, $0<b<1$, $0<c<1$, and $0.95\leq d\leq 1.05$, $$\delta Li_2ZrO_3 \cdot (1-\delta)[xLi_2MnO_3 \cdot (1-x)Li_dNi_aCo_bMn_cO_2] \quad \text{Formula 3}$$

wherein, in Formula 3, $0<\delta<0.1$, $0\leq x<0.1$, $a+b+c\leq 1$, $0<a<1$, $0<b<1$, and $0<c<1$, and $0.95\leq d\leq 1.05$, $$\delta Li_2TiO_3 \cdot (1-\delta)[xLi_2MnO_3 \cdot (1-x)Li_dNi_aCo_bAl_cO_2] \quad \text{Formula 4}$$

wherein, in Formula 4, $0<\delta<0.1$, $0\leq x<0.1$, $a+b+c\leq 1$, $0<a<1$, $0<b<1$, and $0<c<1$, and $0.95\leq d\leq 1.05$, and $$\delta Li_2ZrO_3 \cdot (1-\delta)[xLi_2MnO_3 \cdot (1-x)Li_dNi_aCo_bAl_cO_2] \quad \text{Formula 5}$$

wherein, in Formula 5, $0<\delta<0.1$, $0\leq x<0.1$, $a+b+c\leq 1$, $0<a<1$, $0<b<1$, and $0<c<1$, and $0.95\leq d\leq 1.05$.

6. The composite positive active material of claim 1, wherein, in Formula 1, δ is from 0.01 to 0.03.

7. The composite positive active material of claim 1, wherein, in Formula 1, a is from 0.7 to 0.95, b is from 0.01 to 0.15, c is 0.01 to 0.15, and d is 0.99 to 1.04.

8. The composite positive active material of claim 1, wherein, in Formula 1, a molar ratio of Li to a total content of transition metal is from about 1.015 to about 1.055, wherein the transition metal comprises each of M, Mn, Ni, Co, and M'.

9. The composite positive active material of claim 1, wherein the composite represented by Formula 1 is
0.01Li$_2$TiO$_3$·0.99[0.015Li$_2$MnO$_3$·0.985Li$_{0.99}$Ni$_{0.91}$Co$_{0.06}$Mn$_{0.015}$O$_2$];
0.02Li$_2$TiO$_3$·0.98[0.015Li$_2$MnO$_3$·0.985Li$_{0.99}$Ni$_{0.91}$Co$_{0.06}$Mn$_{0.015}$O$_2$];
0.03Li$_2$TiO$_3$·0.97[0.015Li$_2$MnO$_3$·0.985Li$_{0.99}$Ni$_{0.91}$Co$_{0.06}$Mn$_{0.015}$O$_2$];
0.01Li$_2$TiO$_3$·0.99[0.015Li$_2$MnO$_3$·0.985LiNi$_{0.91}$Co$_{0.06}$Mn$_{0.015}$O$_2$];
0.02Li$_2$TiO$_3$·0.98[0.015Li$_2$MnO$_3$·0.985LiNi$_{0.91}$Co$_{0.06}$Mn$_{0.015}$O$_2$];
0.03Li$_2$TiO$_3$·0.97[0.015Li$_2$MnO$_3$·0.985LiNi$_{0.91}$Co$_{0.06}$Mn$_{0.015}$O$_2$];
0.01Li$_2$TiO$_3$·0.99[0.015Li$_2$MnO$_3$·0.985Li$_{1.01}$Ni$_{0.91}$Co$_{0.06}$Mn$_{0.015}$O$_2$];
0.02Li$_2$TiO$_3$·0.98[0.015Li$_2$MnO$_3$·0.985Li$_{1.01}$Ni$_{0.91}$Co$_{0.06}$Mn$_{0.015}$O$_2$];
0.03Li$_2$TiO$_3$·0.97[0.015Li$_2$MnO$_3$·0.985Li$_{1.01}$Ni$_{0.91}$Co$_{0.06}$Mn$_{0.015}$O$_2$];
0.01Li$_2$TiO$_3$·0.99[0.015Li$_2$MnO$_3$·0.985Li$_{1.02}$Ni$_{0.91}$Co$_{0.06}$Mn$_{0.015}$O$_2$];
0.02Li$_2$TiO$_3$·0.98[0.015Li$_2$MnO$_3$·0.985Li$_{1.02}$Ni$_{0.91}$Co$_{0.06}$Mn$_{0.015}$O$_2$];
0.03Li$_2$TiO$_3$·0.97[0.015Li$_2$MnO$_3$·0.985Li$_{1.02}$Ni$_{0.91}$Co$_{0.06}$Mn$_{0.015}$O$_2$];
0.01Li$_2$TiO$_3$·0.99[0.015Li$_2$MnO$_3$·0.985Li$_{1.03}$Ni$_{0.91}$Co$_{0.06}$Mn$_{0.015}$O$_2$];
0.02Li$_2$TiO$_3$·0.98[0.015Li$_2$MnO$_3$·0.985Li$_{1.03}$Ni$_{0.91}$Co$_{0.06}$Mn$_{0.015}$O$_2$];
0.03Li$_2$TiO$_3$·0.97[0.015Li$_2$MnO$_3$·0.985Li$_{1.03}$Ni$_{0.91}$Co$_{0.06}$Mn$_{0.015}$O$_2$];
0.01Li$_2$TiO$_3$·0.99[0.015Li$_2$MnO$_3$·0.985Li$_{1.04}$Ni$_{0.91}$Co$_{0.06}$Mn$_{0.015}$O$_2$];
0.02Li$_2$TiO$_3$·0.98[0.015Li$_2$MnO$_3$·0.985Li$_{1.04}$Ni$_{0.91}$Co$_{0.06}$Mn$_{0.015}$O$_2$]; or
0.03Li$_2$TiO$_3$·0.97[0.015Li$_2$MnO$_3$·0.985Li$_{1.04}$Ni$_{0.91}$Co$_{0.06}$Mn$_{0.015}$O$_2$].

10. The composite positive active material of claim 1, wherein the composite positive active material has a first peak corresponding to Li$_2$TiO$_3$ at about 0 parts per million, and a second peak at about 200 parts per million to about 1500 parts per million, when analyzed by lithium solid-state nuclear magnetic resonance spectroscopy.

11. The composite positive active material of claim 1, wherein the composite positive active material has an intensity ratio of a peak of a 003 face to a peak of a 104 face of about 1.54 to about 1.64, when analyzed by X-ray diffraction analysis with Cu-Kα radiation.

12. The composite positive active material of claim 1, wherein, the composite positive active material has a peak having a diffraction angle of about 18° 2-theta to about 19° 2-theta and a full width at half maximum of about 0.2° to about 0.28°, when analyzed by X-ray diffraction.

13. The composite positive active material of claim 1, wherein the composite positive active material comprises a primary particle having a size of from about 100 nanometers to about 300 nanometers.

14. The composite positive active material of claim 1, wherein the composite positive active material comprises a coating layer on a surface thereof, the coating layer comprising a conductive material, a metal oxide, an inorganic fluoride, or a combination thereof.

15. The composite positive active material of claim 14, wherein the conductive material comprises a carbonaceous material, indium tin oxide, RuO$_2$, ZnO, or a combination thereof.

16. The composite positive active material of claim 14, wherein the metal oxide comprises silica, alumina, zirconium oxide, titanium oxide, or a combination thereof.

17. The composite positive active material of claim 14, wherein the organic fluoride comprises AlF$_3$, CsF, KF, LiF, NaF, RbF, AgF, AgF, BaF$_2$, CaF$_2$, CuF$_2$, CdF$_2$, FeF$_2$, HgF$_2$, Hg$_2$F$_2$, MnF$_2$, MgF$_2$, NiF$_2$, PbF$_2$, SnF$_2$, SrF$_2$, XeF$_2$, ZnF$_2$, BF$_3$, BiF$_3$, CeF$_3$, CrF$_3$, DyF$_3$, EuF$_3$, GaF$_3$, GdF$_3$, FeF$_3$, HoF$_3$, InF$_3$, LaF$_3$, LuF$_3$, MnF$_3$, NdF$_3$, VOF$_3$, PrF$_3$, SbF$_3$, ScF$_3$, SmF$_3$, TbF$_3$, TiF$_3$, TmF$_3$, YF$_3$, YbF$_3$, TlF$_3$, CeF$_4$, GeF$_4$, HfF$_4$, SiF$_4$, SnF$_4$, TiF$_4$, VF$_4$, ZrF$_4$, NbF$_5$, SbF$_5$, TaF$_5$, BiF$_5$, MoF$_6$, ReF$_6$, SF$_6$, WF$_6$, or a combination thereof.

18. The composite positive active material of claim 1, wherein the Li$_2$MO$_3$ is electrochemically inactive with respect to lithium in a voltage range of about 4.0 volts to about 4.5 volts versus Li/Li$^+$.

19. The composite positive active material of claim 1, wherein the composite is represented by Formula 6:

$$\delta Li_2MO_3 \cdot (1-\delta) Li_d Ni_a Co_b M'_c O_2 \quad \text{Formula 6}$$

wherein, in Formula 6,
M is Ti or Zr,
M' is Mn, V, Mg, Ga, Si, W, Mo, Fe, Cr, Cu, Zn, Ti, Al, B, or a combination thereof;
0<δ<0.5; a+b+c=1; 0<a<1; 0<b<1; 0<c<1; and 1<d≤1.05.

20. A positive electrode comprising a composite positive active material comprising a composite represented by Formula 1:

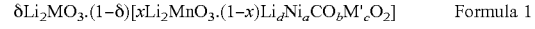
$$\delta Li_2MO_3 \cdot (1-\delta)[xLi_2MnO_3 \cdot (1-x)Li_d Ni_a Co_b M'_c O_2] \quad \text{Formula 1}$$

wherein, in Formula 1,
M is Ti or Zr,
M' is Mn, V, Mg, Ga, Si, W, Mo, Fe, Cr, Cu, Zn, Ti, aluminum (Al), B, or a combination thereof, and
0<δ<0.5, 0≤x<0.3, a+b+c≤1, 0<a<1, 0<b<1, 0<c<1, and 0.95≤d≤1.05.

21. A lithium battery comprising:
the positive electrode of claim 20,
a negative electrode, and
an electrolyte disposed between the positive electrode and the negative electrode.

22. The lithium battery of claim 21, wherein the lithium battery has a voltage of about 4.5 volts or greater.

23. The lithium battery of claim 21, wherein the negative electrode comprises a lithium metal electrode or a lithium metal alloy electrode; or the negative electrode comprises a negative electrode active material comprising a carbonaceous material, silicon, silicon oxide, a silicon alloy, a silicon-carbon composite, Sn, an Sn-containing alloy, a Sn-carbon composite, a metal oxide, or a combination thereof.

* * * * *